(12) United States Patent
Bader-Natal et al.

(10) Patent No.: US 12,659,427 B2
(45) Date of Patent: Jun. 16, 2026

(54) TECHNIQUES FOR COMPUTER GUIDED MULTI-DEVICE GROUP LEARNING

(71) Applicant: People Renaissance, Inc., San Francisco, CA (US)

(72) Inventors: Ari Bader-Natal, Davis, CA (US); Romain Lévy, Los Angeles, CA (US); Hyun Bin Jeong, New York, NY (US); Adán Josué Rodríguez Vivas, Alajuela (CR)

(73) Assignee: People Renaissance, Inc., San Francisco, CA (US)

( * ) Notice: Subject to any disclaimer, the term of this patent is extended or adjusted under 35 U.S.C. 154(b) by 252 days.

(21) Appl. No.: 18/515,233

(22) Filed: Nov. 20, 2023

(65) Prior Publication Data

US 2024/0171421 A1     May 23, 2024

Related U.S. Application Data

(60) Provisional application No. 63/427,576, filed on Nov. 23, 2022.

(51) Int. Cl.

| | |
|---|---|
| *H04N 7/15* | (2006.01) |
| *H04L 12/18* | (2006.01) |
| *H04L 65/1069* | (2022.01) |
| *H04L 65/401* | (2022.01) |
| *H04L 65/403* | (2022.01) |

(52) U.S. Cl.
CPC ........... *H04N 7/15* (2013.01); *H04L 12/1822* (2013.01); *H04L 12/1831* (2013.01); *H04L 65/1069* (2013.01); *H04L 65/4015* (2013.01); *H04L 65/403* (2013.01); *H04N 7/155* (2013.01); *H04N 7/157* (2013.01)

(58) Field of Classification Search
None
See application file for complete search history.

(56) References Cited

U.S. PATENT DOCUMENTS

| | | | |
|---|---|---|---|
| 11,360,634 B1 * | 6/2022 | Chang | G06F 3/0481 |
| 2020/0104092 A1 * | 4/2020 | Cohen | G06F 3/0482 |
| 2022/0138470 A1 * | 5/2022 | Seleskerov | H04L 12/1827 |
| | | | 382/159 |
| 2022/0385859 A1 * | 12/2022 | Tran | H04L 12/1822 |

(Continued)

*Primary Examiner* — Quoc D Tran
(74) *Attorney, Agent, or Firm* — Wolf, Greenfield & Sacks, P.C.

(57) ABSTRACT

Described herein are techniques in which a computer system guides a group of participants through a session (e.g., a learning session) in real time. The techniques remove a need for a leader (e.g., a course instructor) to be present in order to guide the participants (e.g., students) through the session. The techniques allow each participant to join a session using a respective computing device, and interact with shared content through one or more graphical user interfaces (GUIs). The techniques implement the shared content as a sequence of states (e.g., steps), and guide the participants through the sequence of states. The techniques allow the computer system to replace a human in guiding users through a session (e.g., a learning session). By removing the need for human guidance through a session, the techniques exponentially increase the scale at which educational experiences (e.g., for a remote learning session) can be distributed and used.

20 Claims, 30 Drawing Sheets

(56)                    References Cited

U.S. PATENT DOCUMENTS

2023/0273720 A1 *   8/2023   Silverstein .......... H04L 65/4015
                                                    715/753
2024/0021217 A1 *   1/2024   van Rensburg ........ H04N 7/157

* cited by examiner

State
202A

Identifier 202A-1

Threshold Time 202A-2

State Type 202A-3

Configuration Parameters 202A-4

900

This immersion will use built-in video conferencing.

When you connect, you may see a prompt asking you to allow or deny access to camera. ¶ Please *Allow* 🖐

902

904

906

Problem Structuring (Part 1)

1. Orientation (first-timers only)
2. Validation
3. Hear context
4. Review challenge
5. Get started
6. Warm up
7. Get started
8. Review issue

Join your group!

* Having issues with this step?

TECHNIQUES FOR COMPUTER GUIDED MULTI-DEVICE GROUP LEARNING

RELATED APPLICATIONS

This application claims the benefit under 35 U.S.C. § 119(e) of U.S. Provisional Application No. 63/427,576 titled "TECHNIQUES FOR COMPUTER GUIDED MULTI-DEVICE GROUP LEARNING" filed on Nov. 23, 2022, which is incorporated by reference herein in its entirety.

FIELD

Described herein are techniques for computer guided multi-device group learning. In some embodiments, the techniques allow a computer to guide progression of a group of participants through shared content in real time while each of the participants interacts with the shared content using a respective computing device. For example, the techniques may allow a computer to guide remote participants through an Internet-based learning session without having any human instructor present to guide the learning session.

BACKGROUND

Video conferencing allows remote participants to speak face-to-face in real time (or near real time) from different geographic locations. Video conferencing is used in various contexts including workplace meetings, electronic learning (e.g., online courses), candidate interviews, and/or social purposes. Video conferencing can therefore be used in an educational context in order to hold classes. An instructor's live video stream can be broadcasted to multiple remote students that are able to learn from different geographic locations through the Internet. A video conferencing system may provide various tools that allow students and instructors to interact with each other. For example, the video conferencing system may provide the instructor with the capability to view video streams of students (e.g., obtained from webcams of their devices), present material (e.g., slides) to the students, pose a question and poll responses to the question, share files with the students, and/or other capabilities. These capabilities provide the instructor with various tools to facilitate learning through the video conferencing system.

SUMMARY

Remote learning techniques are conventionally implemented using synchronous or asynchronous platforms. Asynchronous learning platforms typically incorporate human expertise at the time that the learning experience is being developed (i.e., subject matter experts and instructional designers at "design-time"), while synchronous learning platforms also rely on human expertise at the time that learners are present (i.e., instructors at "run-time"). The number of experts required to offer synchronous learning experiences grows linearly with the number of participating learners, while the number of experts required to offer asynchronous learning experiences can remain constant. Rather than scale back the use of synchronous learning due to the relative cost, techniques described herein use computer-guided real-time interactions that only require human input when content is being designed.

Roles of a human instructor in a synchronous session may include: (1) structuring and conveying concepts, values, and principles; (2) facilitating group discussions; (3) providing formative and summative feedback to learners; (4) answering questions; (5) contextualizing learning experiences; (6) motivating student engagement in the learning process; and/or (7) discussing orchestration and classroom management.

Skilled instructors can help participants get more out of an experience. They may engage, re-engage, motivate, moderate, discourage bad behavior, encourage good behavior, and provide additional context, among other things. Techniques described herein incorporate such interventions independent of any instructor or facilitator present. The techniques perform the interventions without undermining the nature of the relationship between human participants in a "leaderless" format.

The techniques described herein can fulfill some or all of these roles using a computer-based guidance system, which can provide further roles not otherwise obtainable via conventional instructor-led synchronous learning. Described herein are techniques for computer guided multi-device group learning. According to some embodiments, a computer system guides a group of participants through a session (e.g., a learning session) in real time or near real time. The techniques remove the need for a leader (e.g., a course instructor) to be present to guide the participants (e.g., students) through the session. The techniques allow each participant to join a session using a respective computing device, and interact with shared content through one or more graphical user interfaces (GUIs). The techniques implement the shared content as a sequence of states (e.g., steps), and guide the participants through the sequence of states. The techniques allow the computer system to replace a human in guiding users through a session (e.g., a learning session).

By removing the need for human guidance through a session, the techniques can exponentially increase the scale at which electronic content (e.g., for a remote learning session) can be distributed and used. Further, by using computer-guided learning, the techniques can achieve various aspects that are not otherwise possible though conventional learning approaches. For example, the techniques allow participants to independently navigate among the various states, such that each participant has its own unique state. Further, the techniques can provide data to each participant about other participants progress through the steps so that each participant can have a global view of all of the participants progress in the group learning session. As another example, in an instructor-led synchronous session, issues of timeliness, when to start, and how to pace are determined by the instructor. According to computer-facilitated sessions as described herein, there is no one in a privileged position of responsibility. This is reflected in embodiments described herein by decentralizing responsibilities that would otherwise be centrally-controlled by an instructor. These and additional aspects and features that are not otherwise achievable through conventional synchronous or asynchronous learning approaches are explained further herein.

According to some embodiments of the technology described herein, a system for guiding progression of multiple participants through shared content in real time while each of the participants interacts with the shared content using a respective one of a plurality of computing devices is provided. The shared content includes a sequence of states through which the participants progress to complete an objective. Each of the sequence of states is associated with at least one graphical user interface (GUI). The system comprises: a processor; a non-transitory computer-readable storing instructions that, when executed by the processor, cause the processor to: initiate a communication session in which the system connects, though a communication network, to the plurality of computing devices; provide, through the communication network to the plurality of computing devices, GUIs through which the participants can concurrently interact with the shared content, wherein each of the GUIs includes: a navigation interface configured to allow a respective participant to transition between the sequence of states of the shared content independently of other ones of the participants; and an indication of current states of the other participants in the shared content; detect an update to a current state of one of the participants in the shared content; and in response to detecting the update to the current state of the participant in the shared content, update at least some of the GUIs provided to the plurality of computing devices to indicate the updated state of the participant.

According to some embodiments of the technology described herein, a method for guiding progression of multiple participants through shared content in real time while each of the participants interacts with the shared content using a respective one of a plurality of computing devices is provided. The shared content includes a sequence of states through which the participants progress to complete an objective. Each of the sequence of states is associated with at least one graphical user interface (GUI). The method comprises: using a processor to perform: initiating a communication session in which the system connects, though a communication network, to the plurality of computing devices; providing, through the communication network to the plurality of computing devices, GUIs through which the participants can concurrently interact with the shared content, wherein each of the GUIs includes: a navigation interface configured to allow a respective participant to transition between the sequence of states of the shared content independently of other ones of the participants; and an indication of current states of the other participants in the shared content; detecting an update to a current state of one of the participants in the shared content; and in response to detecting the update to the current state of the participant in the shared content, updating at least some of the GUIs provided to the plurality of computing devices to indicate the updated state of the participant.

According to some embodiments of the technology described herein, a non-transitory computer-readable storage medium storing instructions is provided. The instructions, when executed by a processor, cause the processor to perform a method of guiding progression of multiple participants through shared content in real time while each of the participants interacts with the shared content using a respective one of a plurality of computing devices. The shared content includes a sequence of states through which the participants progress to complete an objective. Each of the sequence of states is associated with at least one graphical user interface (GUI). The method comprises: initiating a communication session in which the system connects, though a communication network, to the plurality of computing devices; providing, through the communication network to the plurality of computing devices, GUIs through which the participants can concurrently interact with the shared content, wherein each of the GUIs includes: a navigation interface configured to allow a respective participant to transition between the sequence of states of the shared content independently of other ones of the participants; and an indication of current states of the other participants in the shared content; detecting an update to a current state of one of the participants in the shared content; and in response to detecting the update to the current state of the participant in the shared content, updating at least some of the GUIs provided to the plurality of computing devices to indicate the updated state of the participant.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1A:
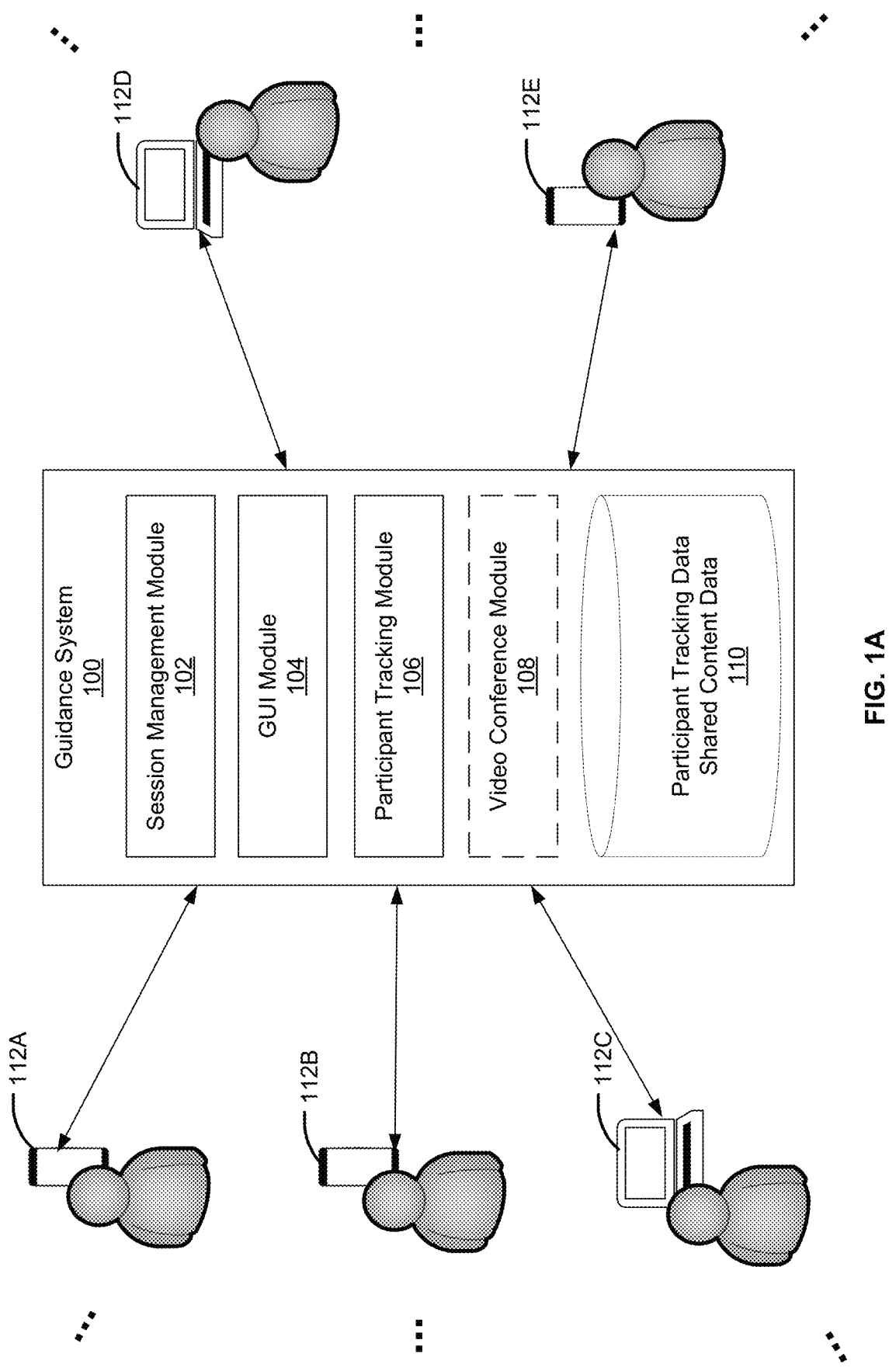
FIG. 1A is an example computer-based guidance system, according to some embodiments of the technology described herein.

Described herein are techniques that allow a computer to entirely guide progression of multiple participants through shared content (e.g., educational learning content) in real time while each of the participants interacts with the shared content using a respective computing device. The shared content includes a sequence of states through which the participants are guided to complete an objective.

As organizations (e.g., companies, educational institutions, and/or other organizations) become more distributed, a great deal of learning takes place remotely. Remote learning techniques are either synchronous or asynchronous. In conventional remote synchronous learning techniques, participants interact with each other using their respective computing devices (e.g., desktops, laptops, smartphones, tablets, etc.) through a collaboration platform. A person (e.g., an expert, teacher, instructor, or other person) leads users through a learning session. For example, participants may interact using a collaboration platform that includes video conferencing (e.g., ZOOM, GOOGLE MEET, MICROSOFT TEAMS, etc.). The collaboration platform may allow users to speak to each other over the Internet using cameras (e.g., webcams) and mics. An instructor leads participants in a learning session using the tools provided by the collaboration platform (e.g., by lecturing, sharing content, leading exercises, and/or other actions).

The inventors have recognized that conventional synchronous remote learning techniques are limited in their scalability. In particular, the number of participants in conventional synchronous learning is limited by the need for human guidance in synchronous learning. A learning session conducted through conventional collaboration platforms typically requires a person (e.g., an instructor) to lead the learning session. Thus, synchronous learning is limited by the availability of instructors. Furthermore, the number of participants that can participate in a synchronous learning session is limited by how many participants a collaboration platform can support in terms of bandwidth, user interface, and tools provided for interaction among participants.

Asynchronous learning techniques provide an alternative to conventional synchronous learning techniques that is not limited in scalability by availability of an instructor. In asynchronous learning, electronic educational content is created and then distributed to users. Each user individually accesses the educational content without interacting with anyone else. For example, the educational content may be provided through a software application that progresses a user through reading material, videos, and/or exercises that the user completes. While asynchronous learning content is scalable to any number of users, it does not allow real time interaction among multiple participants, as each user interacts with the content individually rather than as a group.

To address the above-described issues in conventional remote learning techniques, the inventors have developed synchronous learning techniques that remove the need for human guidance (e.g., by an instructor). The scalability of the techniques is therefore not limited by availability of an instructor. The techniques utilize a computer to guide multiple participants through shared content to complete an objective while the participants interact with the shared content and each other in real time. By using computer-guidance, the techniques provide remote synchronous learning that is more scalable than conventional synchronous learning techniques.

Techniques described herein guide progression of multiple participants through shared content (e.g., educational material) in real time while each of the participants interacts with the shared content using a respective computing device. The shared content includes a sequence of states through which the participants progress to complete an objective. Each of the sequence of states in the shared content may be associated with a respective GUI that a participant may interact with. The techniques provide GUIs to computing devices of the participants, where each GUI includes a navigation interface configured to allow a respective participant to transition between the sequence of states of the shared content independently of other participants. Each GUI indicates current states of other participants in the shared content. The techniques detect updates to current states of the participants and update the GUIs to indicate updated states of participants in the shared content. The GUIs further allow the participants to interact with each other (e.g., through video conferencing, audio, and/or shared interfaces in which the participants can each update content). The techniques provide a synchronous learning experience in which the participants can interact with one another while being guided through the shared content without any human guide (e.g., an expert) needing to be present.

The techniques described herein may be implemented in any of numerous ways, as the techniques are not limited to any particular manner of implementation. Examples of details of implementation are provided herein solely for illustrative purposes. The techniques disclosed herein may be used individually or in any suitable combination as aspects of the technology described herein are not limited to the use of any particular technique or combination of techniques. Furthermore, although some embodiments are described herein in a learning context, some embodiments are not limited to such a context. Such a context is used for illustration purposes and embodiments are not limited in this respect. For example, some embodiments can be used for group learning for software development, advertising, brainstorming, counseling, and/or in any other field, as the techniques are not limited by the learning content.

Some embodiments provide system for guiding progression of multiple participants through shared content in real time while each of the participants interacts with the shared content using a respective one of a plurality of computing devices. The shared content includes a sequence of states (e.g., of an electronic training program) through which the participants progress to complete an objective. Each of the sequence of states is associated with at least one graphical user interface (GUI). The system is configured to: initiate a communication session in which the system connects, though a communication network (e.g., the Internet), to the plurality of computing devices; provide, through the communication network to the plurality of computing devices, GUIs through which the participants can concurrently interact with the shared content. Each of the GUIs includes: a navigation interface configured to allow a respective participant to transition between the sequence of states of the shared content independently of other ones of the participants; and an indication (e.g., a progress bar) of current states of the other participants in the shared content. The system is configured to: detect an update to a current state of one of the participants in the shared content (e.g., by detecting a transition to a previous state or a transition to a subsequent state); and in response to detecting the update to the current state of the participant in the shared content, update at least some of the GUIs provided to the plurality of computing devices to indicate the updated state of the participant.

In some embodiments, the system is configured to: receive, through the communication network from at least some of the plurality of computing devices, video streaming data obtained using cameras (e.g., webcams) of the at least some computing devices; and transmit, through the communication network to the plurality of computing devices, the video stream data for display in the GUIs. In some embodiments, one of the GUIs can be active or inactive on a display of a computing device, and the system is configured to: detect that the GUI is inactive in a display of a first one of the plurality of computing devices; and modify, in the GUIs, a display of video stream data received from the first computing device in response to detecting that the GUI is inactive in the display of the first computing device (e.g., by pausing the display of the video stream data, blurring the display of the video stream data, or replacing the display of the video stream data with a message).

In some embodiments, the system may be configured to individually track the current states of the participants (e.g., by storing, for each participant an amount of time spent by the participant in each of the sequence of states of the shared content). In some embodiments, the system may be configured to, for each of the participants: determine whether an amount of time spent by the participant in a particular one of the sequence of states has reached a threshold amount of time; and generate, in a GUI provided to a computing device of the plurality of computing devices being used by the participant, a graphical element (e.g., an alert message) indicating that the participant has spent the threshold amount of time in the particular state.

In some embodiments, detecting the update to the current state of the participant in the shared content comprises: receiving, through a GUI associated with a first one of the sequence of states, input indicating a request for the participant to transition from the first state to a second one of the sequence of states. In some embodiments, updating the at least some GUIs to indicate the updated state of the participant comprises updating GUIs of other ones of the participants to indicate that the participant is in the second state. In some embodiments, the system may be configured to: update a stored current state of the participant from the first state to the second state in response to receiving the input indicating the request for the participant to transition from the first state to the second state.

In some embodiments, the sequence of states of the shared content include: a first state associated with a first interactive GUI; and a second state associated with a second interactive GUI different from the first interactive GUI. In some embodiments, the at least one GUI comprises one or more of: a shared text editor editable through any of the GUIs; a shared canvas editor editable through any of the GUIs; a shared spreadsheet editable through any of the GUIs; an image adjacent a text editor; and a video clip with a textual transcript.

In some embodiments, at least one of the sequence of states of the shared content is associated with a GUI comprising a read-only display showing content authored in another state by the participant. In some embodiments, the system is further configured to: receive, through the communication network from a particular one of the plurality of computing devices, input modifying the content in the other state by the participant; and updating the read-only display to show modified content in response to receiving the input modifying the content in the other state by the participant.

In some embodiments, the system is further configured to: determine that a particular one of the plurality of computing devices is outputting audio separate from audio of the shared content; and automatically mute a mic of the particular computing device in response to determining that the particular computing device is outputting the audio separate from the audio of the shared content. In some embodiments, the system is further configured to: determine that the particular computing device has stopped outputting the audio separate from the audio of the shared content; and automatically unmute the mic of the particular computing device in response to determining that the particular computing device has stopped outputting the audio separate from the audio of the shared content.

In some embodiments, the system is configured to: for each of the sequence of states of the shared content: store a name, target duration, type, and one or more configuration parameters for the state. In some embodiments, the indication of the current states of the other participants comprises: a plurality of graphical elements each representing a respective state of the sequence of states; and icons associated with respective ones of the participants, each of the icons positioned proximate to a respective one of the plurality of graphical elements that represents a state that a participant associated with the icon is in.

In some embodiments, the system is configured to: collect information about a participant's navigation through the sequence of states; determine, based on the information, that one or more criteria for generating a prompt for at least one of the participants are met; and generate, in at least one of the GUIs associated with at least one participant, the prompt in response to determining that the one or more criteria are met, the prompt indicating an automatically generated instruction for the at least one participant.

FIG. 1A is an example computer-based guidance system 100, according to some embodiments of the technology described herein. The guidance system 100 may comprise one or more computing devices. For example, the guidance system 100 may comprise a server, one or more cloud-based computing devices, and/or other computing device(s). The guidance system 100 provides shared content to multiple computing devices 112A, 112B, 112C, 112D, 112E being used by respective participants to access the shared content. A computing device being used by a participant may also be referred to herein as a "participant device". The guidance system 100 may allow the participants to interact with the shared content concurrently in real time. The guidance system 100 may further provide an interface (e.g., a video conference interface) through which the participants can interact with each other while they interact with the shared content using their participant devices. While the example of FIG. 1A shows five computing devices in communication with the guidance system 100, embodiments described herein are not limited to any particular number of participant devices.

Shared content provided to participant devices by the guidance system 100 may comprise a sequence of multiple states (e.g., steps, stages, or points) through which participants progress. The shared content may comprise various types of material. For example, the shared content may comprise a series of learning activities or exercises (e.g., reading material, videos, and activities) that participants must perform together. As another example, the shared content may comprise brainstorming exercises that participants complete (e.g., for software development or strategizing for a business). As another example, the shared content may comprise team building exercises the participants complete in collaboration with one another. The guidance system 100 guides the participants through the sequence of multiple states while allowing the participants to interact with each other. Each of the states may be associated with one or more GUIs through which participants can interact with the shared content. Example GUIs that may be associated with a state are described herein.

As shown in FIG. 1A, the guidance system 100 includes the following modules: a session management module 102, a GUI module 104, a participant tracking module 106, and a video conference module 108.

The session management module 102 manages communication sessions in which the guidance system 100 communicates with a group of participant devices. The session management module 102 may initiate a communication session. The session management module 102 may allocate resources for the communication session. In some embodiments, the session management module 102 may allocate cloud-based resources for the communication session. For example, the session management module 102 may designate one or more servers to host the communication session. The session management module 102 may allow participant devices to connect to the server(s) to join the communication session. In some embodiments, the session management module 102 may use a web application to host a communication session. Devices may access the web application through the Internet using an Internet browser application.

In some embodiments, the session management module 102 may manage access to a communication session. The session management module 102 may limit access to the communication session to a set of participants. For example, the session management module 102 may authenticate participants using credentials (e.g., username, password, and/or other credentials). As another example, the session management module 102 may limit access to the communication session to participant devices that joined the communication session through a particular gateway (e.g., by using a particular URL).

In some embodiments, the session management module 102 may schedule multiple communication sessions. The session management module 102 may activate a given communication session at a particular time designated for the communication session. For example, the session management module 102 may allow a user to schedule a communication session for a particular time. The session management module 102 may automatically initiate the communication session at the particular time such that participant devices can join the communication session at the particular time.

In some embodiments, a participant device may join a communication session using an Internet browser application. For example, the participant may navigate to a particular website through which the participant device can join the communication session. In some embodiments, a participant device may join a communication session using a software client specific to the guidance system 100. For example, the software client may be installed on the participant device and used to join communication sessions established by the session management module 102.

The GUI module 104 may provide various GUIs to the participant devices through which participants can interact with shared content. The GUIs provided to the participant devices may include a navigation interface that allows participants to transition between states of the shared content. The navigation interface may allow a participant to advance to a subsequent state and/or return to a previous state. For example, the navigation interface may include a button that allows a participant to advance to a subsequent state. In another example, the navigation interface may include a button that allows a participant to return to a previous state. In some embodiments, the navigation interface may include a graphical representation of a sequence of states of the shared content. For example, the navigation interface may include an ordered list of different states of the shared content. In this example, a user may access an item from the list (e.g., by clicking or tapping on the item) to navigate to a particular state of the shared content. To illustrate, each item in the list may be a reference (e.g., a URL) to a respective state of the shared content.

In some embodiments, a navigation interface may allow a participant to transition between states of the shared content independent of the other participants. The navigation interface allows the participant to advance and/or retreat through the states irrespective of the current states of other participants. In some embodiments, the guidance system 100 may change a state of a particular participant in response to receiving input through the navigation interface indicating a request for the particular participant to transition from one state to another state. For example, the guidance system 100 may receive the input in response to selection of a "next" or "back" button in the navigation interface. As another example, the guidance system 100 may receive the input in response to selection of a graphical element (e.g., an item on a list) representing a particular state. The guidance system 100 may transition a participant from a first state to a second state by navigating the user to GUI(s) associated with the second state.

In some embodiments, the GUIs may indicate current states of other participants in the shared content. A GUI provided to a device of a participant may provide a graphical element indicating a current state of each of the other participants. In some embodiments, the GUI of a first participant may display a current state of a second participant when the first participant performs a certain action. For example, the GUI may display the current state of the second participant when the first participant hovers over a username, video stream display, or other content associated with the second participant in the GUI. In some embodiments, the GUI may include a section displaying current states of all the other participants. For example, the GUI may indicate a current state of each of the other participants proximate a video stream display (e.g., of a webcam) associated with the participant. In some embodiments, the GUI may include a persisted indication of a current state of each participant. For example, the GUI may include a graphical element (e.g., an avatar, icon, photo, or other graphical element) corresponding to each participant. The GUI may display the graphical element of each participant proximate a visual representation of a state (e.g., a name of a state in a listing of states included in the GUI). By visually indicating current states of participants as part of the GUI, the guidance system 100 allows the participants to synchronize themselves without the need for human guidance. Each participant may adjust the advancement through the sequence of states of the shared content based on current states of other participants. The participants may converge on a particular state using the indications of current states of the participants.

In some embodiments, the GUIs provided to the participant devices may indicate time spent by a participant in a state of the shared content. In some embodiments, a GUI may display an amount of time elapsed since the participant entered the state. In some embodiments, a GUI may graphically represent time elapsed since the participant entered the state (e.g., using a bar that changes positions as time elapses). In some embodiments, a GUI may alert a participant when the participant has reached a threshold time (e.g., a target time designated for a state). For example, the GUI may display a message indicating that the participant has spent the threshold time in the state. As another example, a graphical element in the GUI may change color indicating that the participant has spent the threshold time in the state.

In some embodiments, the GUI module 104 may be configured to provide, for each state of the shared content, one or more GUIs associated with the state to a participant device that enters the state. A GUI associated with the state may provide specific content designated for the state. For example, the GUI may allow the participant to perform a particular activity. One example GUI is a collaborative text editor in which multiple participants can enter values in one or more fields. Another example GUI is a collaborative visual canvas editor that multiple participants can interact with. Another example GUI is a collaborative spreadsheet editor that multiple participants can edit. Another example GUI is a side-by-side text editor in which text inputs of different participants are displayed side-by-side and updated in real time. Another example GUI is one that allows a participant to view a video clip and an accompanying transcript of the clip. Another example GUI is a multiple text editor displaying content input by participants in a previous state. Editing of content may be restricted to a participant that authored the content. The GUI module 104 may automatically update the display in response to updates made by participants in the previous state.

In some embodiments, the GUI module 104 may be configured to provide prompts to participants' in their respective GUIs while the participants interact with the shared content. The GUI module 104 may be configured to provide a prompt in a GUI by displaying a graphical element indicating the prompt in the GUI. The prompt may provide messaging to the participants to facilitate their progression through the states of the shared content. In some embodiments, the GUI module 104 may be configured to automatically generate a prompt indicating an instruction for one or more participants. The GUI module 104 may be configured to process information about the progression of the participant(s) and generate the prompt in response to detecting that one or more criteria are met. The guidance system 100 may use prompts as an instructor-less mechanism for guiding users. For example, the guidance system 100 may use prompts to display situation-specific guidance, encourage participation, and/or facilitate participant progression. This helps participants in various ways. For example, participants can more effectively engage with each other and/or gain more educational benefits in a group learning context provided by the guidance system 100.

In some embodiments, a prompt may be a private prompt that is only visible to a particular participant or a group prompt that is visible to all participants interacting with the shared content. In some embodiments, the GUI module 104 may be configured to position a prompt in a GUI in various locations. For example, the GUI module 104 may position a prompt at a fixed portion of the GUI. As another example, the GUI module 104 may position a prompt as an overlay in a fixed portion of the GUI. As another example, the GUI module 104 may present a prompt as a tooltip visually associated with another graphical element in the GUI. The graphical element may be based on stored properties of the prompt such as its type and content of a message of the prompt.

In some embodiments, the GUI module 104 may be configured to remove (e.g., dismiss) a presented prompt. The GUI module 104 may be configured to remove a prompt in response to detecting a set of one or more conditions. For example, the GUI module 104 may determine to remove a prompt when the user navigates to a subsequent state, a user completes an action by the prompt, and/or another condition. In some embodiments, the GUI module 104 may be configured to remove a prompt in response to a user input indicating a command to dismiss the prompt (e.g., in response to selection of a button labeled "dismiss" associated with the prompt). In some embodiments, the GUI module 104 may be configured to remove a prompt after a threshold period of time after the prompt is initially presented. For example, the GUI module 104 may automatically remove a prompt after the prompt is presented for a time period of 1-5 minutes, 5-10 minutes, 10-15 minutes, 15-20 minutes, or another suitable time period. In some embodiments, the threshold period of time may be dynamically configured based on other properties of the prompt (e.g., whether it is a private or group prompt, its position in a GUI, and/or other properties). In some embodiments, the GUI module 104 may be configured to remove a prompt in response to detecting that a set of one or more conditions is met.

In some embodiments, the GUI module 104 may be configured to provide various different types of prompts. Example prompts include the following.

a. Pace
  i. Prompt in response to detecting that a participant remains too long in a timed state.
  ii. Prompt in response to detecting that a participant is moving too quickly through the states.
  iii. Prompt in response to detecting that a participant is significantly ahead of other participants.
  iv. Prompt in response to detecting that a participant is significantly behind other participants.
  v. Prompt (individual or group) in response to detecting that all participants are not in the same state.
b. Discussion Participation
  i. Prompt in response to detecting that a participant is talking during a solo/individual step.
  ii. Prompt (group) in response to detecting that none of the participants is talking.
  iii. Prompt in response to detecting that a participant is not talking enough during a group activity.
  iv. Prompt in response to detecting that a participant's turn is over in a turn-taking group step.

v. Prompt in response to detecting that a particular participant is speaking significantly more/less than others in the group.

c. First User Experience i. Prompt elements of a guided product tour in response to detecting that this is the participant's first immersion experience.

d. Just-in-time Instructions i. Rather than providing all instructions up-front before an activity begins, responsive prompts can be used to notify a participant or group in the event that they are not following the intended behavior.

In some embodiments, GUIs provided to participant devices may include sections identifying participants. For example, a GUI may display names of the participants. As another example, a GUI may display, for each participant, an avatar representing the participant. In some embodiments, a GUI may display video stream data from participant devices. For example, a GUI may include a webcam feed display for each of the participants. The participants may thus see each other and speak to each other in a video conference while the participants interact with the shared content. A GUI may further include controls associated with video streaming. For example, the GUI may include a graphical element that allows a participant to toggle the video stream display on or off. As another example, the GUI may include a graphical element that allows a participant to toggle a mic between mute and unmute states. In some embodiments, a GUI may include configuration controls that allow a participant to adjust a view of video stream displays (e.g., an arrangement or placement of the displays within the GUI).

In some embodiments, the GUIs may provide visual cues facilitating progression of a participant through the shared content. For example, a GUI may indicate a message when a participant has finished an activity in a state. As another example, a GUI may indicate that all other participants have advanced past a state. As another example, a GUI may indicate that a participant has not completed a previous state. As another example, a GUI may indicate that a threshold amount of time has elapsed, and that the participant should advance to a subsequent state.

In some embodiments, the GUI module 104 may be configured to generate a graphical progress indicator in each participant's GUI. The graphical progress indicator may visually indicate a sequence of states and a length of expected time for each state. For example, the graphical progress indicator may comprise a sequence of bars, each representing a respective state. The length of the bar may indicate an amount of time expected for the state represented by the bar. In some embodiments, the graphical progress indicator may indicate which participants are at each state (e.g., by displaying an icon representing the participant proximate a bar associated with the state). In some embodiments, the graphical progress indicator may represent completed states, a current state, and future states with different visual properties (e.g., different colors). For example, bar(s) associated with completed states may be green, a bar associated with a current state may be black and gray, and bar(s) associated with future states may be gray.

In some embodiments, a GUI may include a timer tracking an amount of time spent by a participant in a state. A GUI may visually depict the time and provide a visual cue of the time. A GUI may further indicate when the participant has spent a threshold amount of time in the state. In some embodiments, a GUI may indicate a type of activity or exercise involved in the state. In some embodiments, a GUI may display an agenda for the shared content (e.g., a listing of states of the shared content). In some embodiments, a GUI may include instructions and/or hints to facilitate the participant's completion of an activity or exercise in the state. In some embodiments, a GUI may include a menu with additional options. In some embodiments, a GUI may include representations of various participants (e.g., avatars or video streams). In some embodiments, a GUI may include an activity canvas in which the participant is to provide input to complete an activity or exercise.

Figure 1B:
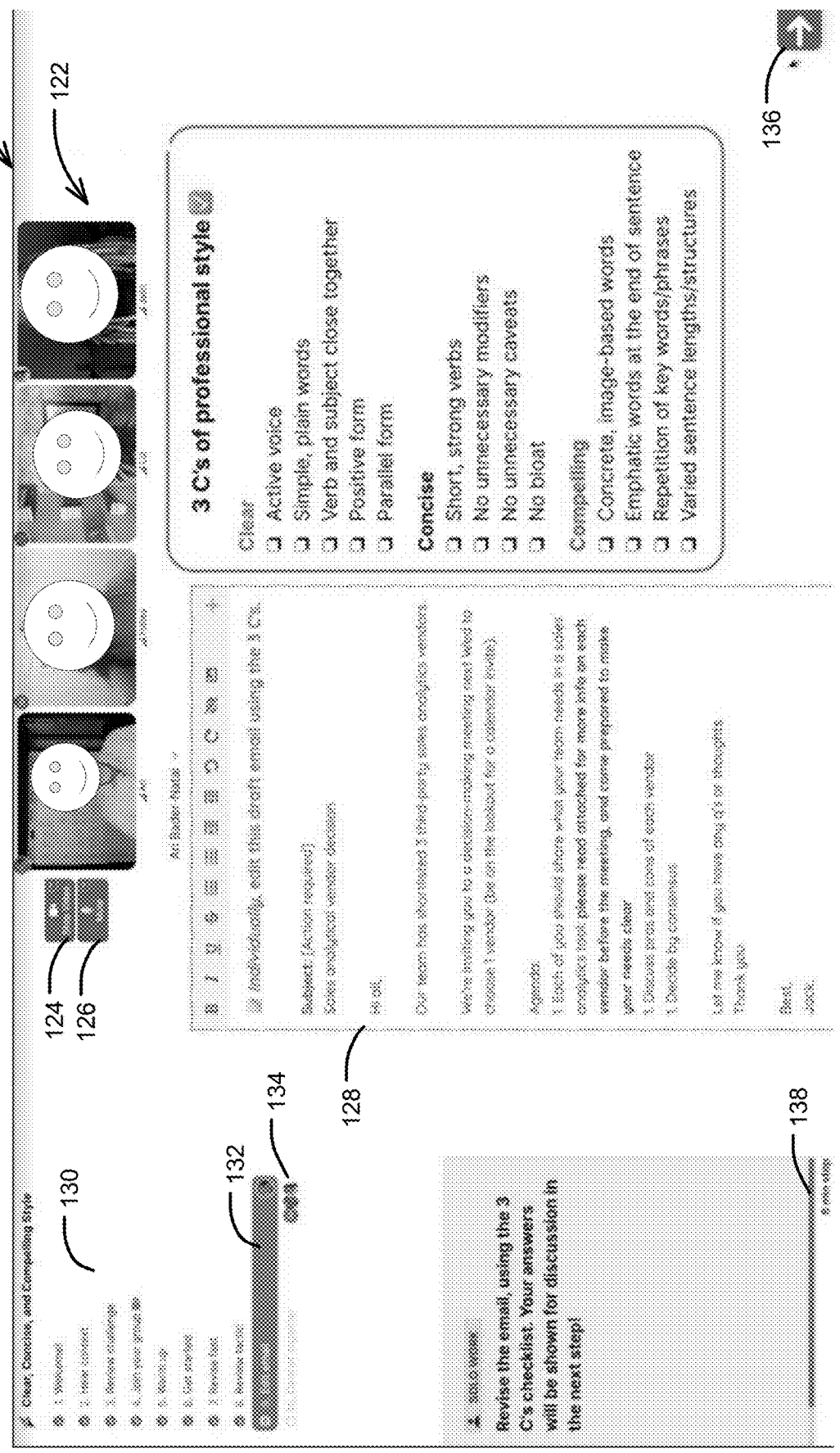
FIG. 1B is an example GUI that may be provided to a participant device by the guidance system of FIG. 1A, according to some embodiments of the technology described herein.

FIG. 1B shows an example GUI 120 that may be provided by the GUI module 104 to a participant device, according to some embodiments of the technology described herein. The GUI 120 may be shown on a display of the participant device. The GUI 120 includes an array 122 of video stream displays at the top of the GUI 120. The video stream displays may display video stream data obtained from cameras (e.g., webcams) of the participant devices. The GUI 120 further includes a control 124 that allows the participant to toggle the participant's video stream on or off. The GUI 120 further includes a control 126 that allows the participant to toggle a mic of the participant device on or off. The GUI 120 shows a GUI 128 associated with a current state that the participant is in (i.e., the "Edit email" state as highlighted in the listing 130 of states). The GUI 128 includes a text editor in which the participant can enter textual information.

The GUI 120 includes a navigation interface including a listing 130 of states. The listing 130 of states may be a component of a navigation interface. The listing 130 has a check next to names of states that the participant has already advanced through. The current state 132 of the participant is highlighted in the listing 130 to inform the participant of the current state. The listing 130 also includes icons 134 associated with other participants indicating current states of the other participants. As indicated by the icons 134 of FIG. 1B, the other participants are in a subsequent state relative to the participant interacting with the GUI 120. The GUI 120 further includes a next button 136 that, when selected by the participant, will advance the participant device to the subsequent state.

The GUI 120 includes a component 138 indicating time that has elapsed since the participant has been in the current state, along with a threshold amount of time designated for the current state. In the example of FIG. 1B, the component 138 indicates that the threshold amount of time for the current state is 6 minutes. The component 138 further shows a bar that is growing as time elapses to indicate to the participant how much time has elapsed and how much time is remaining relative to the threshold amount of time designated for the current state.

The participant tracking module 106 may track the current states of all the participants. The tracked current states may be indicated in GUIs provided to the participant devices (e.g., as described in reference to the GUI module 104). In some embodiments, the participant tracking module 106 may track a state of each participant. For example, the participant tracking module 106 may store a current state of each participant and update the stored state in response to detecting an update to the current state. The participant tracking module 106 may: (1) detect an updated state of a participant in the shared content; and (2) update GUIs of other participants to indicate the updated state of the participant in response to detecting the updated state of the participant. By tracking and indicating updated states for all the participants in GUIs provided to the participant devices, the guidance system 100 allows the participants to progress through the shared content together.

In some embodiments, the participant tracking module 106 may track updates to a participant's current state based on interactions with GUIs provided to the participant's device. The participant tracking module 106 may: (1) receive input through a GUI indicating a request for the participant to transition from a first state to a second state; and (2) update a stored current state of the participant in response to receiving the input. For example, the participant tracking module 106 may update a record associated with the participant stored by the participant tracking module 106.

In some embodiments, the participant tracking module 106 may track times spent by a participant in each of one or more states of shared content. The participant tracking module 106 may: (1) determine an amount of time spent by the participant in the state; and (2) store the amount of time spent in the state in a record associated with the participant. The stored amount of time may be used to affect GUIs provided to a participant device (e.g., to provide visual cues that facilitate progress through the shared content).

The video conference module 108 may provide video conferencing as part of a communication session. Participants may thus interact with each other through a video conference in real time as they interact with the shared content. The video conference may allow the participants to speak to each other and collaborate as they progress through the shared content. The video conference may allow the participants to cohesively advance through the shared content without the need for a designated leader (e.g., an instructor). As described herein with reference to the GUI module 104, the GUIs may include displays of video stream data from participant devices (e.g., from web cameras of the participant devices). The video conference module 108 may obtain video stream data from the participant devices and display them within GUIs. For example, the video conference module 108 may show video feeds in designated portions of a GUI (e.g., by displaying a video feed of each participant in a space designated for the participant).

In some embodiments, the video conference module 108 may further manage control video display. The video conference module 108 may provide a control that can be used by a participant to toggle on/off a display of the participant's video feed. The video conference module 108 may provide a control that can be used by a participant to toggle on/off the participant's device's mic. In some embodiments, the video conference module 108 may perform intelligent control of toggling on/off a video stream feed from a participant device. For example, the video conference module 108 may toggle a video stream display based on whether a GUI is currently active in a display as described herein with reference to FIG. 6A. As another example, the video conference module 108 may perform intelligent control of a participant device's mic based on whether the participant device is outputting audio separate from the shared content as described herein with reference to FIG. 7A.

As indicated by the dotted lines around the video conference module 108, in some embodiments, the guidance system 100 may not include a video conference module 108. In such embodiments, the guidance system 100 may note provide video conference capabilities during a session. In some embodiments, the guidance system 100 may provide communication mechanisms instead of or in addition to video conferencing. For example, the guidance system 100 may provide a chat interface through which the participants can message each other in real time. As another example, the guidance system 100 may provide teleconferencing without video.

As shown in FIG. 1A, the guidance system 100 further includes a datastore 110. The datastore 110 may include one or more storage devices. For example, the datastore 110 may include one or more hard drives. In some embodiments, the datastore 110 may include cloud based storage devices. The guidance system 100 may use the datastore 110 to store participant tracking data and shared content data. Examples of participant tracking data and shared content data are described herein.

Each of the participant devices 112A, 112B, 112C, 112D, 112E may be any suitable computing device. For example, a participant device may be a desktop computer, a laptop computer, a smartphone, a tablet, or other suitable computing device. In some embodiments, the guidance system 100 may allow a user to join a communication session using multiple different devices. The guidance system 100 may store a current state information for a participant, and then load the participant in the same current state when the participant moves from a first device (e.g., a laptop) to a second device (e.g., a smartphone). The guidance system 100 may further store one or more timers (e.g., associated with state(s)) for a participant, and maintain the status of the timer(s) when the participant joins a communication session from a different device.

The guidance system 100 may be configured to communicate with the participant devices 112A, 112B, 112C, 112D, 112E through a communication network. In some embodiments, the communication network may be a wireless network. The wireless network may be local area network (LAN), a wide area network (WAN), or another suitable wireless network. For example, the communication network may be the Internet. In some embodiments, the communication network may be a wired network.

Figure 2A:
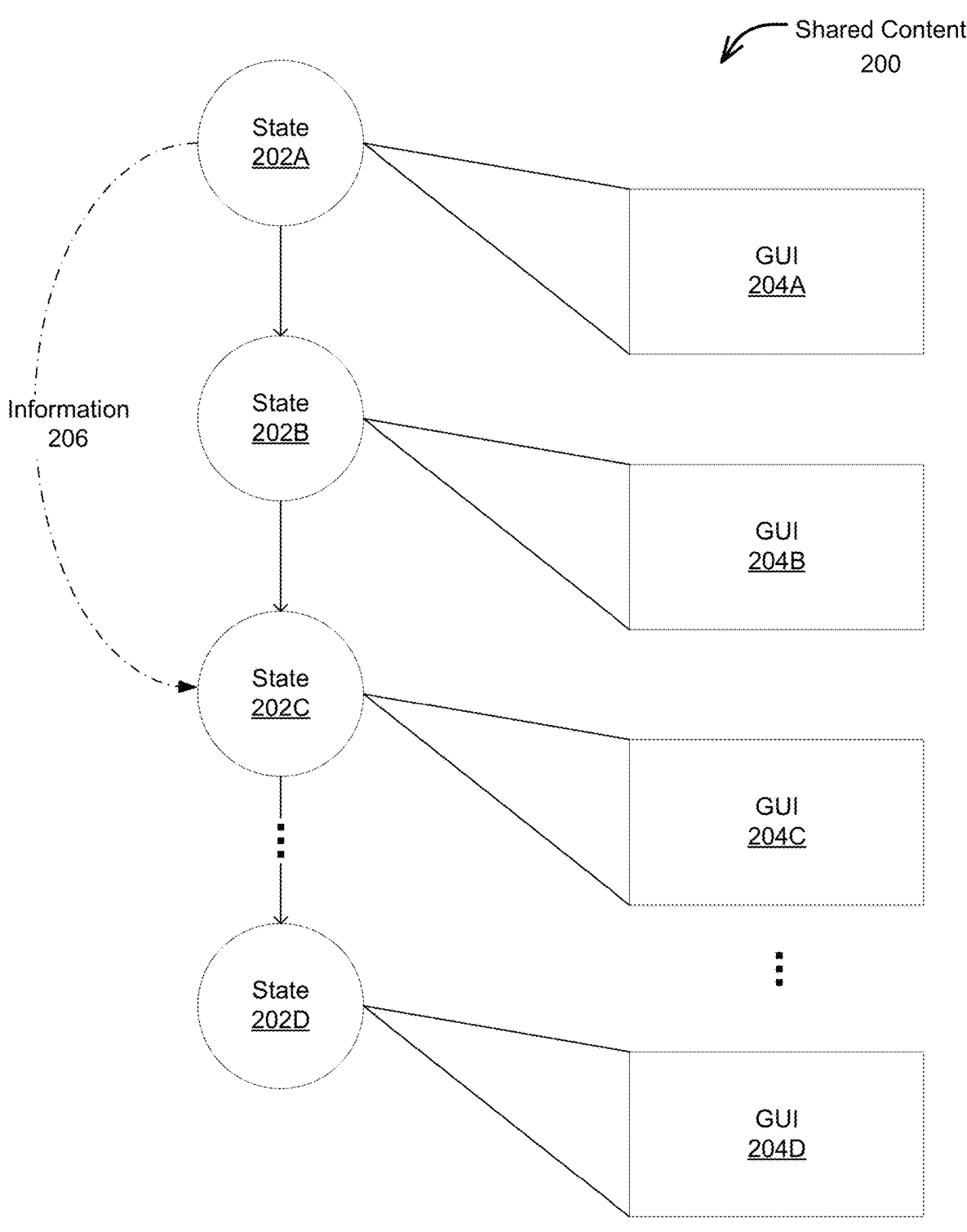
FIG. 2A is a depiction of shared content comprising a sequence of states, according to some embodiments of the technology described herein.

FIG. 2A is a depiction of shared content 200 comprising a sequence of states, according to some embodiments of the technology described herein. In some embodiments, the shared content 200 is shared content that can be provided by guidance system 100 described herein with reference to FIG. 1A.

As shown in FIG. 2A, the shared content comprises the sequence of states 202A, 202B, 202C . . . 202D. Each state of the shared content includes a respective content. In some embodiments, the shared content 200 may comprise any number of states.

In some embodiments, each of the states may be a stage or step that participants must complete. Each of the states may include an activity or task that the participants complete. For example, the activity or task may be watching a video, reading a set of material, inputting information (e.g., written information), collaborating with other participants to provide input, or other activity or task. In some embodiments, the sequence of states 202A-202D may build towards an objective. For example, the sequence of states 202A-202D may allow the participants to work together to generate a final answer for an exercise in multiple component steps.

As illustrated in FIG. 2A, the states 202A-202D are associated with respective GUIs 204A, 204B, 204C . . . 204D. When a participant device navigates to any one of the states 204A-204D, the guidance system 100 may present, on a display of the participant device, a GUI associated with the state. A participant may then interact with the GUI independently and/or in collaboration with other participants. For example, a GUI may be a shared interface in which each of multiple participants can provide input. For example, the GUI may comprise a shared graphic with input fields that each of the participants can modify through a respective GUI of the participant. As another example, a GUI may be an independent one that a participant interacts with individually.

In some embodiments, a state may include a threshold amount of time that a participant should aim to spend in the state. A GUI associated with the state may provide a visual indication of an amount of time that the participant has currently spent in the state. For example, the GUI may display a timer or graphical element representing passage of time. When the threshold amount of time elapses, the GUI may provide a visual cue to the user to proceed to the next state. In some embodiments, the guidance system 100 may allow a participant to determine when to proceed to a subsequent state. For example, the GUI may only provide a visual cue without enforcing a particular action (e.g., advancement to the subsequent state). In such embodiments, multiple participants may synchronize themselves based on indications of current participant states provided in the GUIs. In some embodiments, the guidance system 100 may enforce an action on a participant when the guidance system 100 detects that the participant has spent the threshold amount of time in a state. For example, the guidance system 100 may automatically transition the participant to a subsequent state (e.g., by displaying a GUI associated with the subsequent state in a display of the participant's device).

In some embodiments, a participant may navigate between the states 202A-202D. A guidance system 100. The guidance system 100 may allow a participant to return to a previous state or advance to a subsequent state. For example, a participant may need to reference something or modify something in a previous state that the participant had already advanced through. The guidance system 100 may allow the participant to return to the previous state to view the information and/or make a modification in a GUI associated with the previous state.

As indicated by the dotted arrow of FIG. 2A, in some embodiments, information 206 may be transmitted across multiple states. In the example of FIG. 2A, information is transmitted from state 202A to the state 202C. The information obtained from state 202A may be used to generate content in state 202C. For example, a participant may have input information into the GUI 204A associated with state 202A. The guidance system 100 may use the information to generate content of state 202C. When the participant advances to state 202C, the GUI 204C associated with state 202C may automatically be configured according to the information 206. For example, the guidance system 100 may prepopulate information in the GUI 204C associated with state 202C using the information 206. As another example, the guidance system 100 may configure graphical content in the GUI 204C using the information 206. As another example, the guidance system 100 may determine a type of GUI presented in association with the state 202C using the information 206.

Figure 2B:
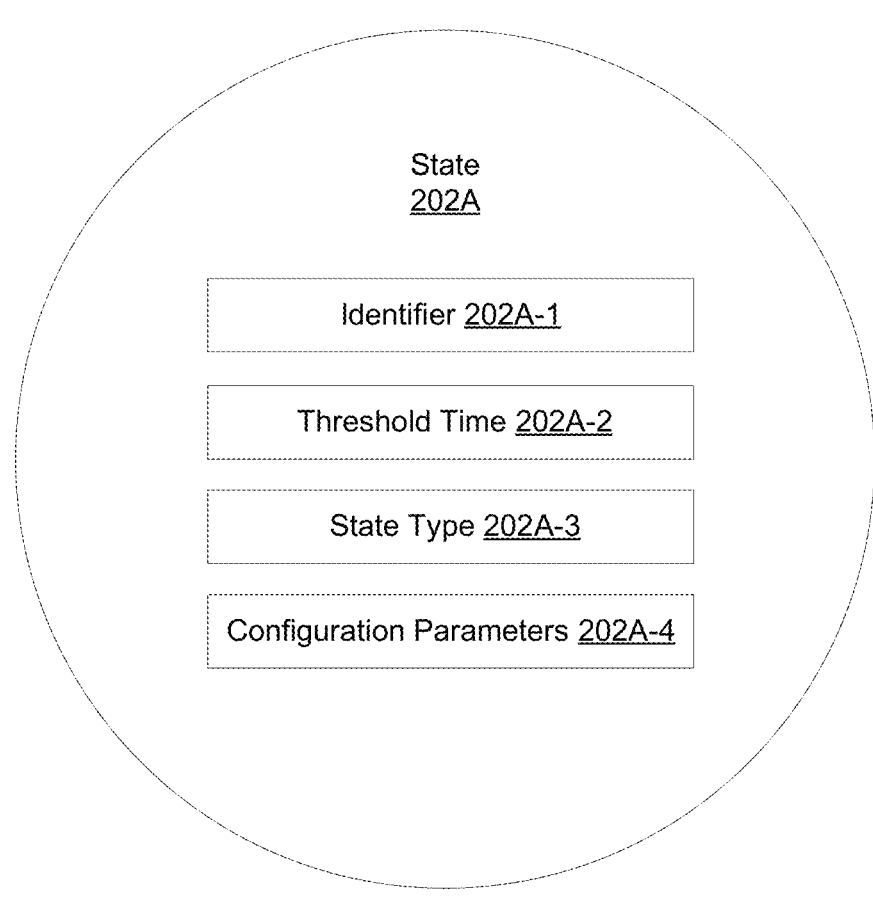
FIG. 2B is an example of information for configuring a state of the shared content of FIG. 2A, according to some embodiments of the technology described herein.

FIG. 2B is an example of information for configuring a state 202A of the shared content 200 of FIG. 2A, according to some embodiments of the technology described herein. In some embodiments, the guidance system 100 may store information for a state of shared content as illustrated in FIG. 2B.

The state 202A includes an identifier 202A-1 for the state 202A. In some embodiments, the identifier 202A-1 may be an alphanumeric string identifying the state 202A. For example, the alphanumeric string may indicate a name of the state 202A. In some embodiments, the identifier 202A-1 may be displayed in a GUI presented on a participant device (e.g., in a navigation interface). For example, the identifier 202A-1 may be a title of the state 202A-1 displayed in a navigation interface.

The state 202A includes a threshold time 202A-2 for a participant to spend in the state 202A. In some embodiments, the threshold amount of time 202A-2 may be used to provide a visual cue to a participant to advance. In some embodiments, the threshold amount of time 202A-2 may be used to enforce an action on a participant (e.g., by automatically advancing the participant to a subsequent state). The threshold time 202A-2 may be a configurable value (e.g., by an administrator or designer of shared content). In some embodiments, the threshold time 202A-2 may be adjustable by participants (e.g., prior to beginning progression through shared content).

The state 202A includes a state type 202A-3 parameter. The state type 202A-3 may indicate a type of GUI associated with the state 202A. The guidance system 100 may: (1) determine a state type 202A-3 for the state 202A; and (2) determine the GUI 204A associated with the state 202A using the state type 202A-3. In some embodiments, the state type 202A-3 may indicate a type of activity or exercise to be completed in the state 202A. The guidance system 100 may, for example, use the state type 202A-3 to identify a particular application to load for the activity or exercise indicated by the state type 202A-3.

The state 202A includes various configuration parameters 202A-4. In some embodiments, the configuration parameters 202A-4 may be determined by the state type 202A-3. For example, different GUIs indicated by the state type 202A-3 may have different sets of configuration parameters 202A-4. In some embodiments, the configuration parameters 202A-4 may include fields to be populated in the GUI 204A associated with the state 202A, settings that configure aspects of the GUI 204A, instructions to provide to a participant, instructions to access a software application, and/or other configuration parameters.

Figure 2C:
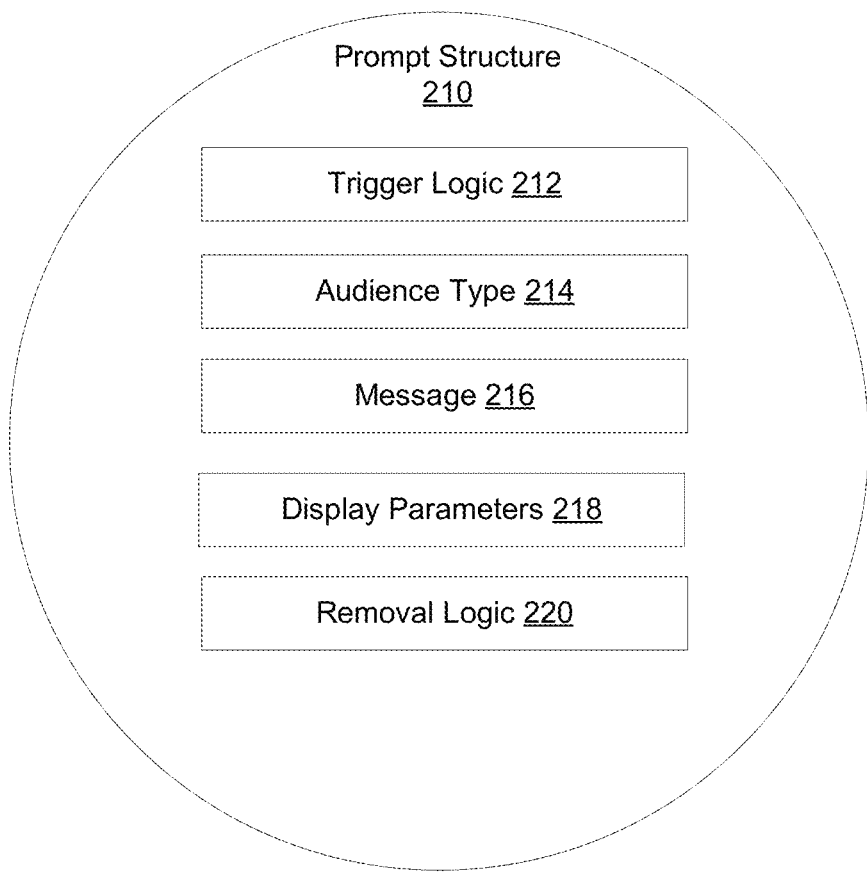
FIG. 2C is an example of a prompt data structure used by the guidance system, according to some embodiments of the technology described herein.

FIG. 2C is an example of a prompt structure 210 used by the guidance system, according to some embodiments of the technology described herein. The prompt data structure 210 of FIG. 2C may be used by the guidance system to represent and display prompts. As shown in FIG. 2C, the prompt structure 210 includes trigger logic 212, audience type 214, a message 216, display parameters 218, and removal logic 220.

In some embodiments, the trigger logic 212 may indicate a logical statement defining one or more criteria that cause the guidance system to present a prompt indicated by the prompt structure 210. Examples of such criteria include one or more of the following.

a. The participant is 2 or more states ahead of the "median group step."

b. The participant completed two states in a row in less than 50% of allotted time for each.

c. The participant is currently in a solo state and the participant is currently speaking.

d. The participant has spoken more than others in the group during the past three states.

e. The participant entered the first group video state.

In some embodiments, the audience type 214 may be an individual or entire group. For example, the prompt structure 210 may store a first value indicating the prompt is to be displayed to an individual participant and a second value indicating that the prompt is to be displayed to a group (e.g., all) of the participants. In some embodiments, the message 216 may be content that is to be presented in the prompt. The content may include text (e.g., plaintext and/or formatted rich text), an image, a video, and/or an audio clip.

In some embodiments, the display parameters 218 may indicate visual properties of the display that is to be presented in a GUI. The display parameters 218 may indicate visual placement of the message. For example, the display parameters 218 may indicate whether the prompt is to be: (1) fixed inline in a dedicated region of a GUI, (2) displayed as an overlay in a fixed portion of the GUI, or (3) presented as a tooltip in association with another graphical element of the GUI (e.g., which may be determined based on content of the message 216).

In some embodiments, the removal logic 220 may be a logical statement indicating one or more criteria in which to remove the prompt. For example, the one or more criteria may include one or more of the following criteria: (1) the prompt includes a "dismiss" option that is selected by the user. (2) the prompt has been presented in a GUI for a threshold amount of time, and/or (3) a set of one or more conditions are met (e.g., a participant navigates to another state and/or participant completes an action recommended in a message of the prompt).

In some embodiments, the guidance system may be configured to generate a prompt by instantiating a prompt structure 210 representing the prompt and configuring the prompt structure 210. The guidance system may instantiate a prompt structure based on user input. For example, a prompt may be generated by a cross-account administrator and/or an account-specific client administrator. In some embodiments, a prompt created by a cross-account administrator may be accessible for all users of the guidance system unless the account-specific client administrator for a given user account has disabled the prompt for the user account. In some embodiments, a prompt created by an account-specific administrator may only be used by users that are within a particular account (e.g., in a particular organization associated with the account). Thus, the guidance system may present prompts that were authored centrally by a cross-account administrator and also may present prompts that are specific to an account (e.g., specific to an organization).

Figure 3A:
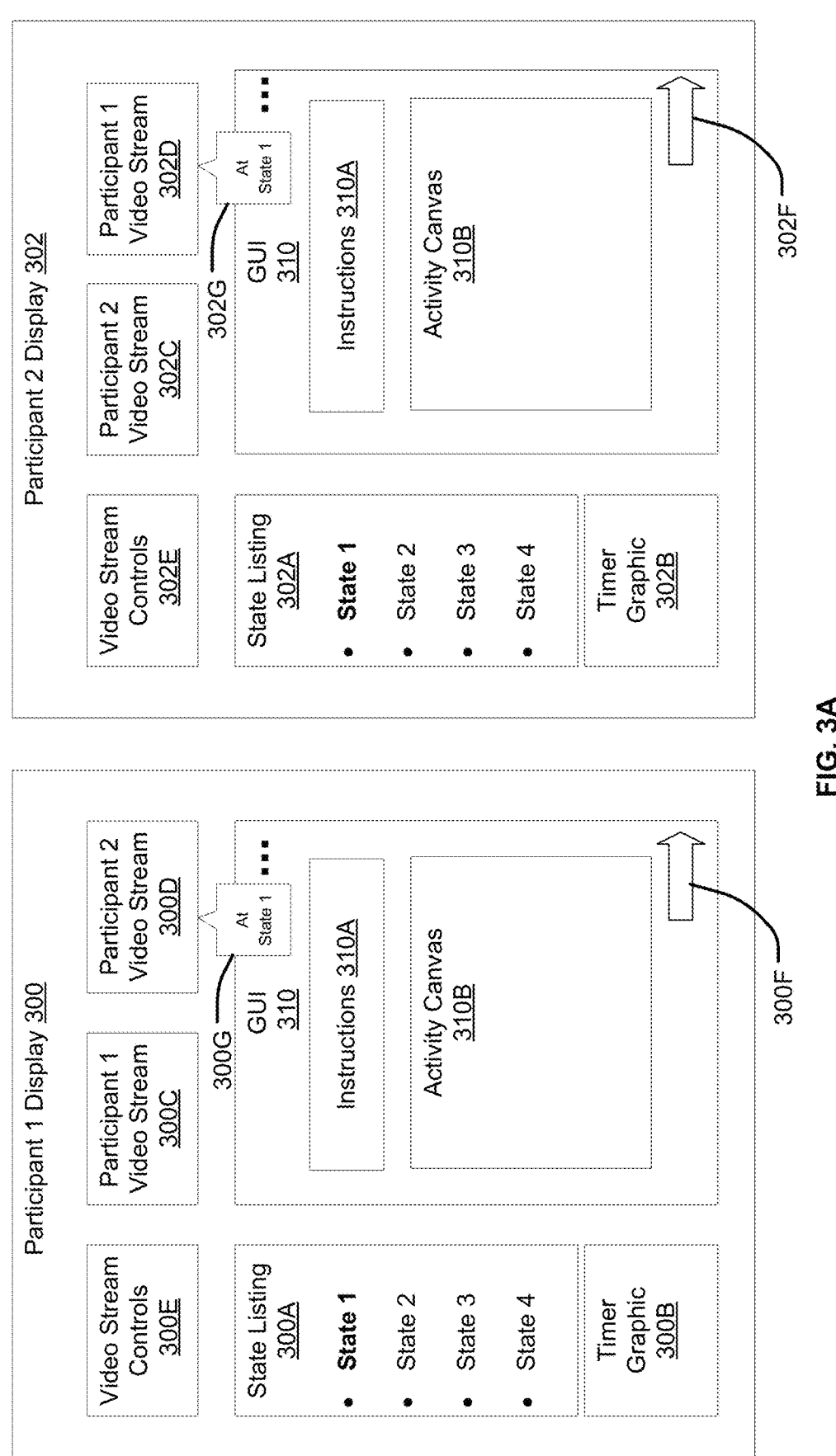
FIG. 3A shows example displays of two participant devices being used by two participants of a session when the two participants are at the first state of shared content, according to some embodiments of the technology described herein.

FIG. 3A shows example displays 300, 302 of two participant devices being used by two participants of a session when the two participants are at the first state of shared content, according to some embodiments of the technology described herein. As shown in FIG. 3A, the displays 300, 302 include respective state listings 300A, 302A indicating a current state of the respective participant. The state listings 300A, 302A may further be part of a navigation interface and can be used to transition between states (e.g., by clicking or tapping on names of different states in the listings 300A, 302A). The displays 300, 302 further include respective timer graphics 300B, 302B visually indicating an amount of time that the respective participants have spent in the current state and/or whether the respective participants have spent a threshold amount of time in the current state. The displays 300, 302 further include sections 300C, 302C for video streams of the respective participants (e.g., obtained using respective webcams). The displays 300, 302 also include sections 300D, 302D each showing a video stream of the other participant. The displays 300, 302 further include video stream controls 300E, 302E that can be used by the respective participants to control their video streams (e.g., toggle it on/off, toggle a mic on/off, and/or other controls). The displays 300, 302 further include buttons 300F, 302F that allow respective participants to advance to a subsequent state.

In FIG. 3A, both of the participants are in the first state as indicated by the bolded "State 1" in the state listings 300A, 302A. The first participant's display 300 provides an indication 300G of the current state of the second participant. In FIG. 3A, the second participant is indicated to be at the first state. Likewise, the second participant's display 302 provides an indication 302G of the current state of the first participant. In FIG. 3A, the first participant is indicated to also be at the first state. In some embodiments, the visual indications 300G, 302G may always be displayed. In some embodiments, the visual indications 300G, 302G may be displayed in response to an action (e.g., hovering a cursor over or tapping a video stream display). The displays 300, 302 each include a GUI 310 associated with the first state. The GUI 310 includes instructions 310A and an activity canvas 310B. Example GUIs that may be associated with a state are described herein.

Figure 3B:
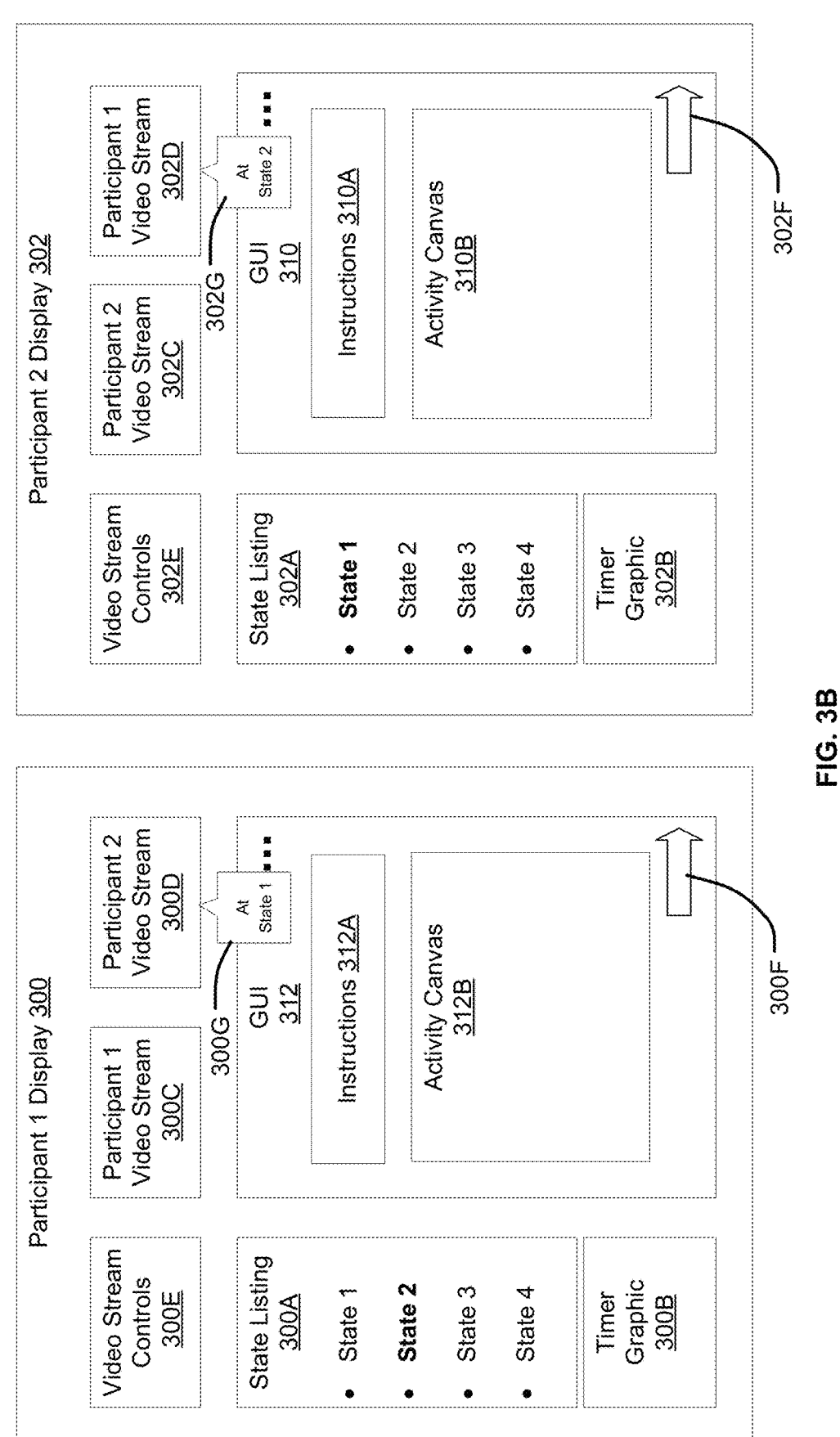
FIG. 3B shows the participants' displays after the first participant has advanced to a second state of the shared content, according to some embodiments of the technology described herein.

FIG. 3B shows the participants' displays 300, 302 after the first participant has advanced to a second state of the shared content, according to some embodiments of the technology described herein. As shown in display 300, the "State 2" in the state listing 300A is bolded indicating that the first participant is in the second state. The display 300 now shows a GUI 312 associated with the second state. The GUI 312 includes instructions 312A and a respective activity canvas 312B. The second participant is still shown by indication 300G to be at the first state because the second participant has not advanced to the second state. The indication 302G of the second participant's display 302 now shows that the first participant is at the second state.

Figure 3C:
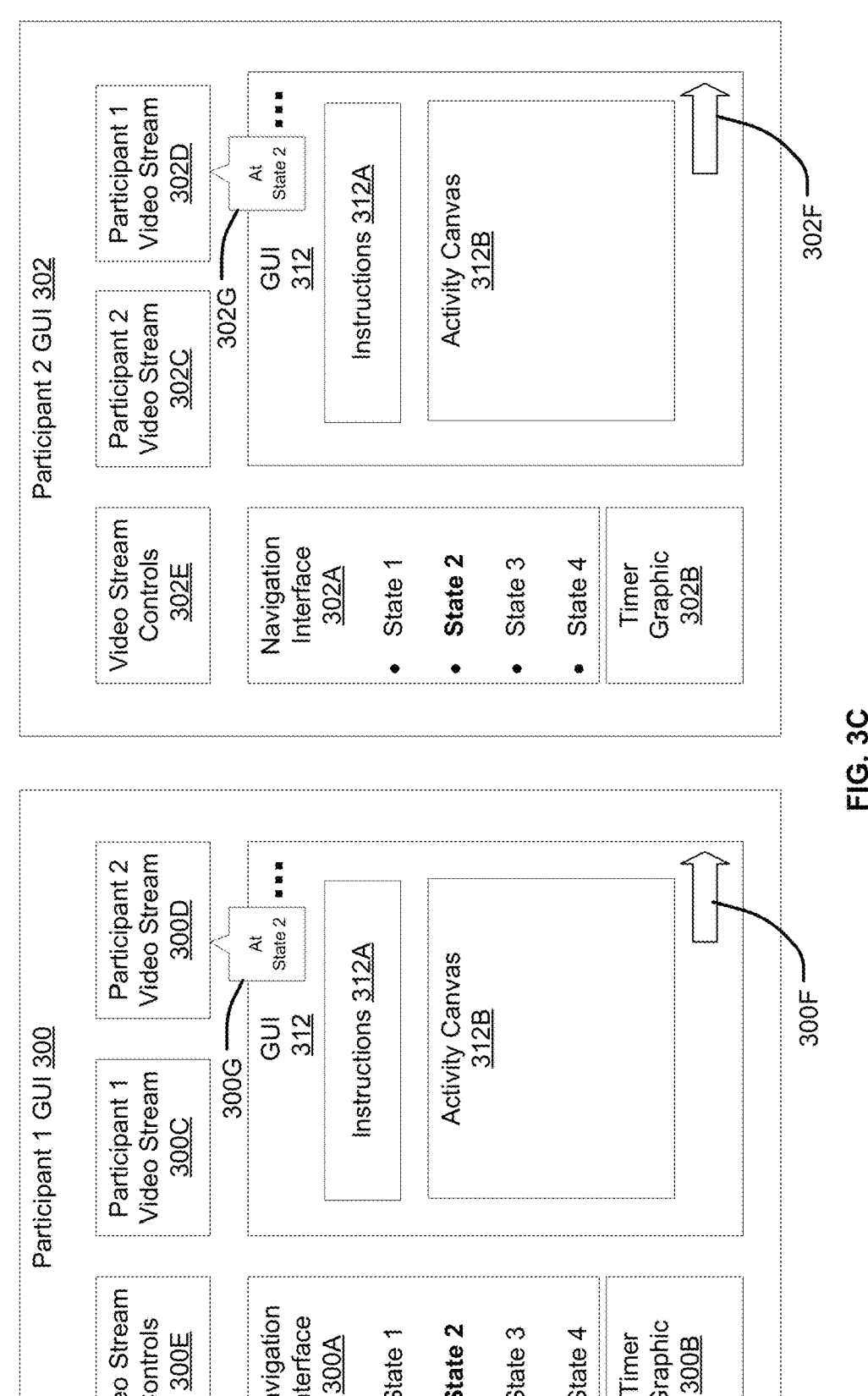
FIG. 3C shows the participants' displays after both of the participants have advanced to the second state of the shared content, according to some embodiments of the technology described herein

FIG. 3C shows the participants' displays 300, 302 after both of the participants have advanced to the second state of the shared content, according to some embodiments of the technology described herein. As shown in FIG. 3C, both of the displays 300, 302 now display the GUI 312 associated with the second state. The indication 300G in the first participant's display 300 now shows that the second participant is at the second state.

Figure 3D:
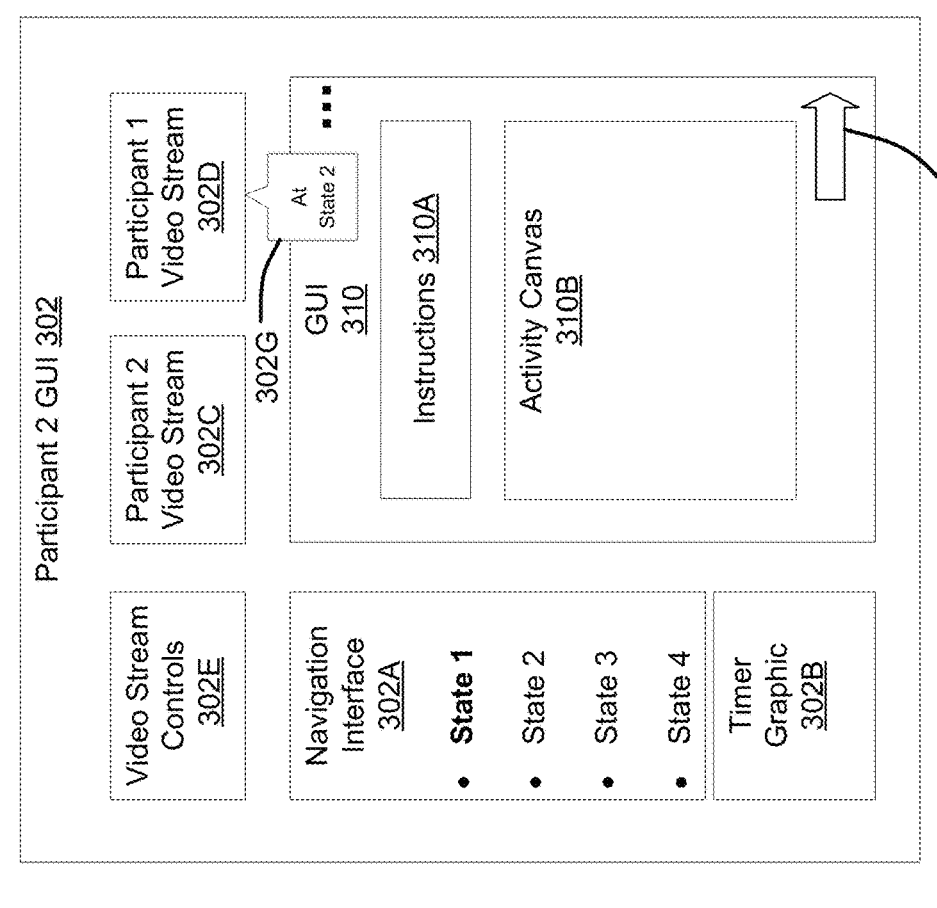
FIG. 3D shows the participants' displays after the second participant has returned to the first state of the shared content, according to some embodiments of the technology described herein.
Figure 3D:
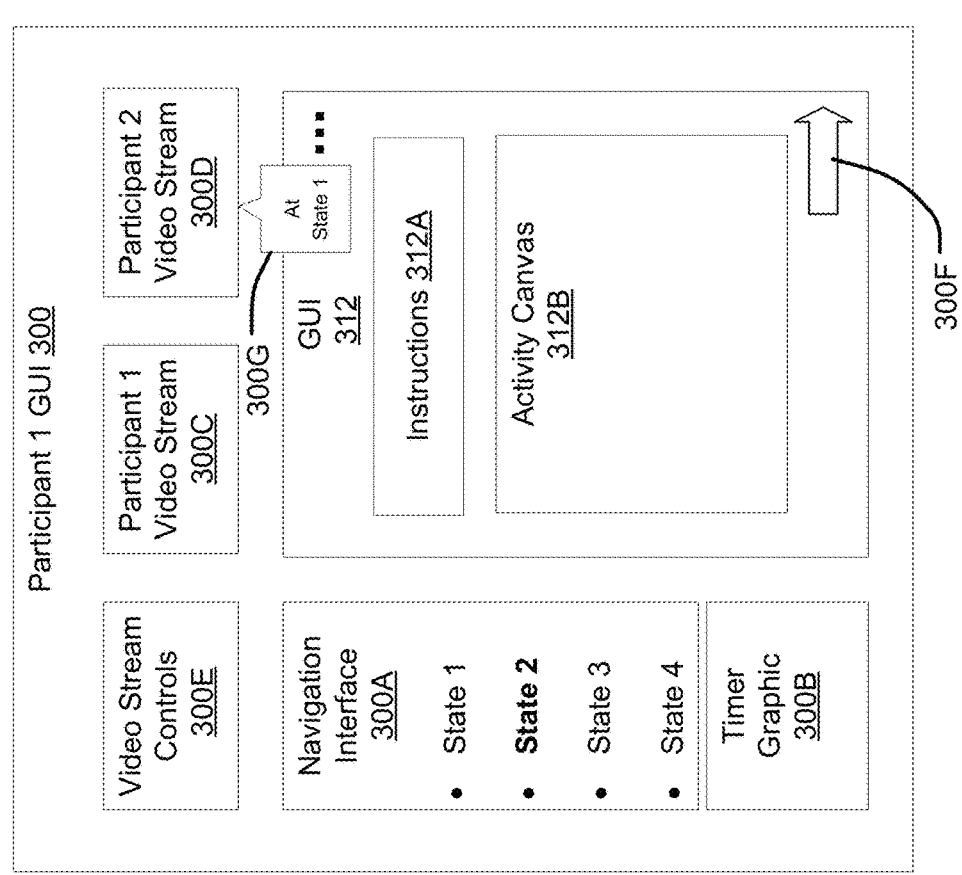

FIG. 3D shows the participants' displays 300, 302 after the second participant has returned to the first state of the shared content, according to some embodiments of the technology described herein. The second participant's display 302 now shows the GUI 310 associated with the first state as the second participant has returned to the first state. The indication 300G in the first participant's display 300 now shows that the second participant is at the first state.

In some embodiments, each of the GUIs of the participants may include a progress indicator (e.g., progress indicator 804 described herein with reference to FIGS. 8A-8I). The progress indicator may visually indicate the current state of the participant, as well the state(s) of other participants. The progress indicator may further indicate states that have been completed and states that still remain to be traversed by the participant. For example, the progress indicator may be a horizontally or vertically arranged sequence of bars that each represent a respective state. Each of the bars may have a width determined based on an estimated amount of time expected to complete a state associated with the bar. Bars representing state(s) completed by the participant may be a first color or combination of colors, a bar representing a current state of the participant may be a second color or combination of colors, and bar(s) representing future state(s) may be a third color or combination of colors. The progress indicator may allow the participant to: (1) be aware of the participant's position in the shared content and relative to other participant(s); and (2) work to synchronize his/herself with the other participant(s).

Figure 4:
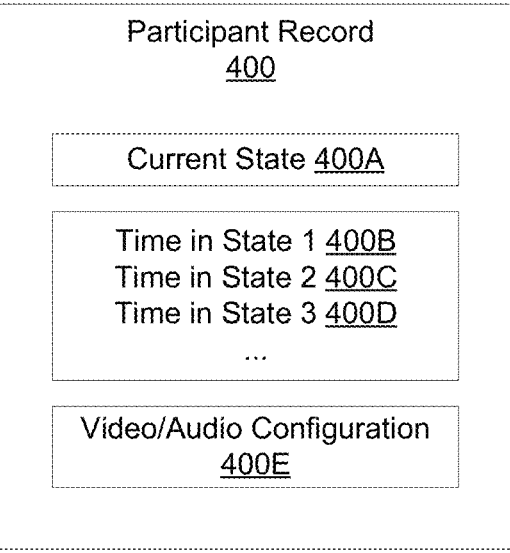
FIG. 4 is an example participant record that can be used by a computer-based guidance system to track a participant, according to some embodiments of the technology described herein.

FIG. 4 is an example participant record 400 that can be used by a computer-based guidance system to track a participant, according to some embodiments of the technology described herein. In some embodiments, the guidance system 100 may use the participant record 400 to track the current state of each participant.

As shown in FIG. 4, the participant record 400 includes an indication of a current state 400A of the participant. For example, the participant record 400 may include an identifier (e.g., a name, code, URL, or other identifier) of a current state of shared content that the participant is in. The guidance system 100 may update the current state 400A in the participant record 400 in response to detecting that the participant has changed states. The guidance system 100 may further propagate the update to GUIs displayed by other participant devices (e.g., as described herein with reference to FIGS. 3A-3D).

As shown in FIG. 4, the participant record 400 further includes a time spent by the participant in each of various states. In the example of FIG. 4, the participant record 400 includes times 400B, 400C, 400D spent by the participant in each of the first, second, and third states. The guidance system 100 may update the times in the participant record 400 when the user is in any one of the states. The guidance system 100 may use the stored times to generate visual cues for the participant (e.g., to indicate that the participant should advance to a subsequent state). The guidance system 100 may further use the stored times 400B, 400C, 400D and the current state 400A to rejoin a participant into a session (e.g., because the participant changed devices or otherwise left the session for a period of time).

As shown in FIG. 4, the participant record 400 further includes a video/audio configuration 400E for the participant. The configuration 400E may indicate a setting of a toggle to turn a video stream of the participant's device on/off and/or a setting of toggle to turn a mic of the participant's device on/off. The guidance system 100 may update the configuration 400E in response to modifications by the participant and/or automatic modifications made by the guidance system 100 (e.g., as described herein with reference to FIGS. 6 and 7).

Figure 5:
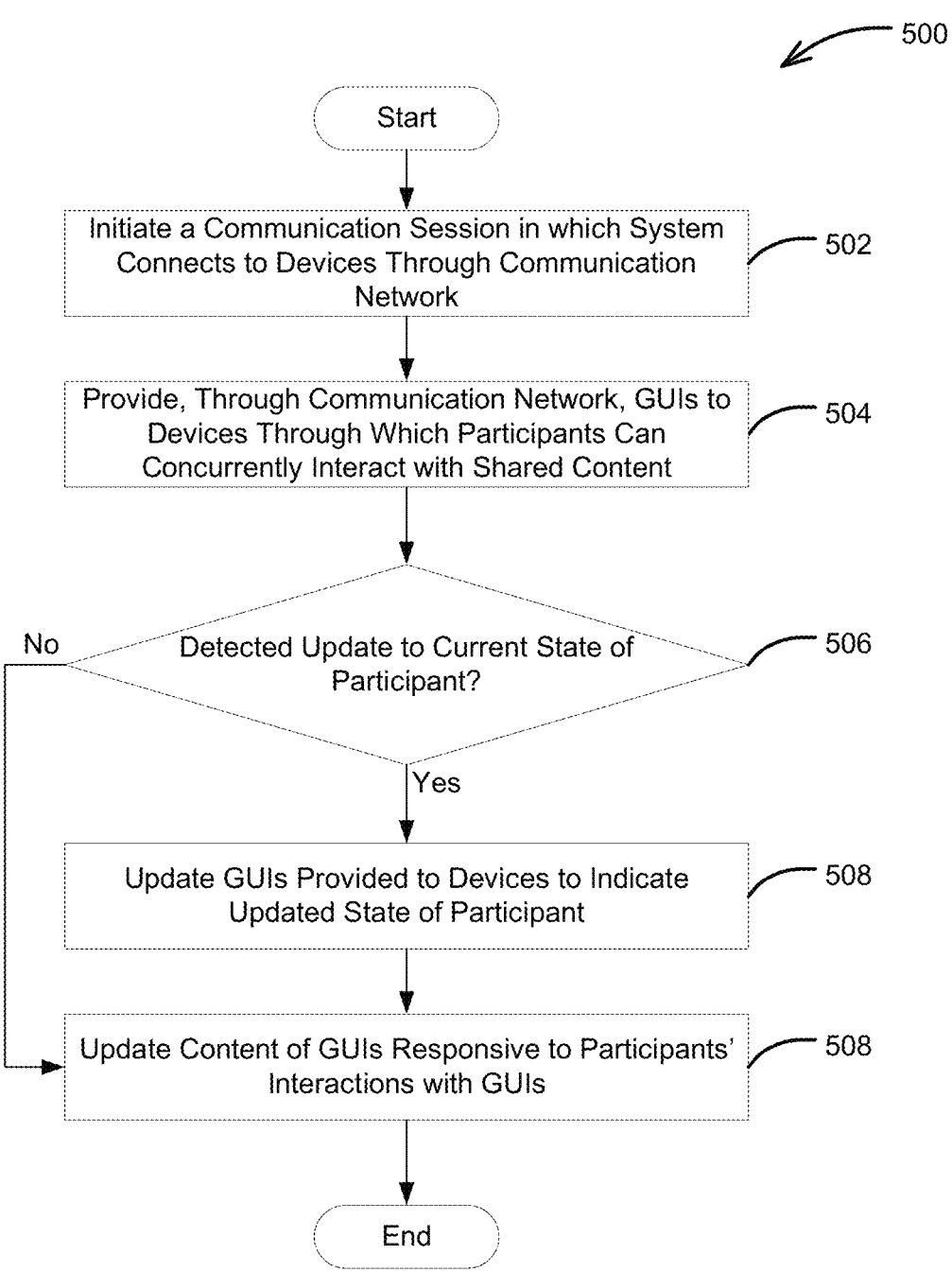
FIG. 5 is an example process of guiding progression of multiple participants through shared content in real time, according to some embodiments of the technology described herein.

FIG. 5 is an example process 500 of guiding progression of multiple participants through shared content in real time, according to some embodiments of the technology described herein. In some embodiments, process 500 may be performed by guidance system 100 described herein with reference to FIG. 1A.

Process 500 begins at block 500 where the system initiates a communication session in which the system connects to multiple participant devices through a communication network (e.g., the Internet). Each of the participant devices may join the session (e.g., using a web browsing application or a specific client). The system may host the session (e.g., using one or more servers that the participant devices can connect to through the communication network). In some embodiments, the system may initiate the session at a scheduled time. For example, a user may have scheduled the session to begin at a particular time. The system may initiate the session at the particular time. The system may allow connections of authorized participants at or after the particular time.

Next, process 500 proceeds to block 500, where the system provides, through the communication network, GUIs to the participant devices through which participants can concurrently interact with the shared content. The shared content includes a sequence of multiple states, each associated with a respective GUI. The participants may independently progress through the states and interact with their associated GUIs.

In some embodiments, the GUIs provided to the participant devices include a navigation interface that allows the participants to transition between the sequence of states of the shared content. For example, a participant may select a displayed forward arrow to advance to a subsequent state or select a displayed back arrow to return to a previous state. As another example, a participant may be able to select a state from a listing of the states to transition to the selected state.

In some embodiments, a GUI provided to a participant device may indicate current states of other participants. The participant may use the indicated current states to determine how far the other participants' have advanced. The participant may quicken or slow the participant's pace of progression through the shared content based on the indicated current states of the other participants. In this manner, the system may de-centralize control of progression through shared content.

In some embodiments, GUIs provided to the participant devices may include a video conference interface. The video conference interface may include displays of video stream data obtained from the participant devices (e.g., obtained using webcams of the participant devices). The video conference interface may allow the participants to interact with each other as they interact with the shared content (e.g., by speaking to each other). For example, the video conference may be used by the participants to discuss activities and exercises included in the shared content.

Next, process 500 proceeds to block 506, where the system determines whether an update to a current state of a participant has been detected. As described herein, the system may be configured to track current states of all the participants in the shared content (e.g., in respective participant records maintained by the system). The system may detect whether there is an update to the current state of the participant based on interactions of the participant with a GUI provided to the participant's device. For example, the system may detect an update to the current state of the participant in response to receiving, through the GUI, input indicating a request for the user to transition from one state to another state (e.g., as a result of selection a forward or back arrow and/or selection of a different state in a listing of states).

If at block 506 the system detects an update to the current state of a participant, then process 500 proceeds to block 508, where the system updates GUIs provided to other participant devices to indicate the updated state of the participant. For example, the system may transmit signals through the communication network that, when received by the participant devices, cause the participant devices to update their GUIs to indicate the updated current state of the participant. In some embodiments, the system may update the current state of the participant in a participant record in response to the detection. Updating the participant record may trigger updates in the GUIs. Participants may be informed of the current states of other participants and use the information to progress through shared content together. After updating the GUIs provided to the participant devices, process 500 proceeds to block 508 where the system updates content of GUIs in response to the participants' interactions with the GUIs. For example, the system may update the GUIs to indicate information (e.g., text) input by participants.

If at block 506 the system does not detect an update to the current state of a participant, then process 500 proceeds to block 508 where the system continues to update GUI content responsive to participant interaction with the GUIs. In this case, the system does not update current state indications of any participant in the GUIs provided to the participant devices given that no change in state has been detected.

Figure 6A:
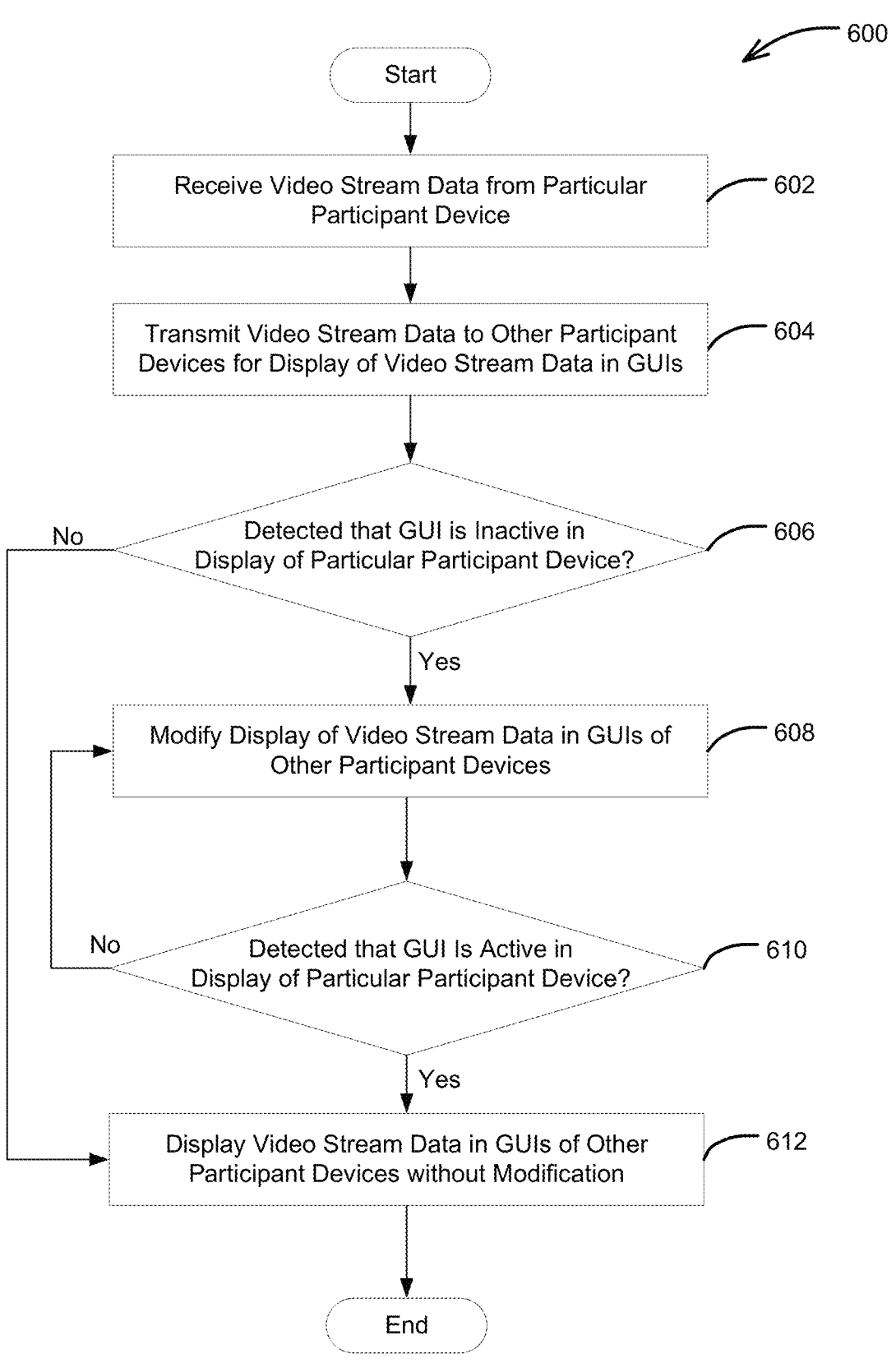
FIG. 6A is an example process of modifying a display of video stream data from a participant device, according to some embodiments of the technology described herein.

FIG. 6A is an example process 600 of modifying a display of video stream data from a participant device, according to some embodiments of the technology described herein. In some embodiments, process 600 may be performed by guidance system 100 described herein with reference to FIG. 1A. For example, process 600 may be performed by the video conference module 108 of the guidance system 100.

Process 600 begins at block 602, where the system receives video stream data from the participant device. The system may receive the video stream data through a communication session in which the system exchanges data with the participant device.

Next, process 600 proceeds to block 604, where the system transmits the video stream data to other participant devices for display in GUIs provided to those participant devices. For example, the video stream data may be displayed in a section (e.g., a rectangular window) designated for a participant in the GUIs. The video stream data may be displayed in conjunction with displays of video stream data of other participant devices in a video conference interface.

Next, process 600 proceeds to block 606, where the system determines whether a GUI of the shared content is inactive in a display of the participant device. The system may determine whether the GUI is inactive using various techniques. For example, the GUI may be presented in an Internet browser application that can have multiple tabs and the system may determine that the GUI is inactive by detecting that the participant has selected a tab different than the one displaying the GUI. As another example, the system may determine that the GUI is inactive in the display by determining that a different window is expanded on the particular participant device than one displaying the GUI. As another example, the system may determine that the GUI is inactive by determining that another application is being viewed on the particular participant device (e.g., a smartphone).

Figure 6B:
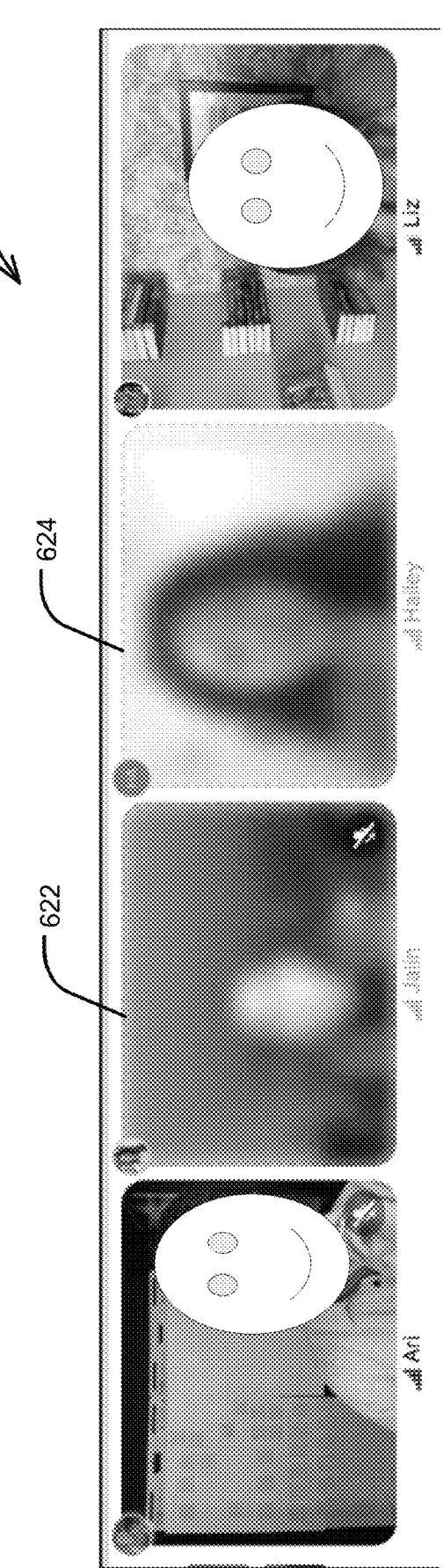
FIG. 6B is an example portion of a GUI showing modified displays of video stream data from participant devices, according to some embodiments of the technology described herein.

If at block 606 the system detects that the GUI is inactive in the display of the participant device, then process 600 proceeds to block 608, where the system modifies display of the video stream data received from the participant device in GUIs of the other participant devices. In some embodiments, the system may modify a display of the video stream data by pausing a video stream, blurring the display, replacing the display of the video stream data with a message, or another suitable modification. FIG. 6B is an example GUI portion 620 showing modified displays of video stream data from participant devices, according to some embodiments of the technology described herein. The GUI portion 620 may, for example, form a part of the GUI 120 described herein with reference to FIG. 1B. As shown in FIG. 6B, the displays 622, 624 of video stream data have been blurred as a result of the system detecting that GUIs of the respective participant devices from which the video stream data is being obtained are not currently active in displays of the respective participant devices.

Next, process 600 proceeds to block 610, where the system determines whether the GUI is active in the display of the participant device. If the system determines that the GUI is active in the display of the participant device, then process 600 proceeds to block 612 where the system displays the video stream data of the participant device in GUIs of the other participant devices without modification. The system thus stops the modification performed at block 608. However, if the system determines at block 610 that the GUI is still inactive in the display of the participant device, then process 600 returns to block 608 where the system continues modifying the display of the video stream data in the GUIs of the other participant devices.

If at block 606 the system does not determine that the GUI is not currently active in the display of the participant device (i.e., that the GUI is active in the display), then process 600 proceeds to block 612 where the system displays the video stream data from the participant device in the GUIs of the other participant devices without modification.

Figure 7A:
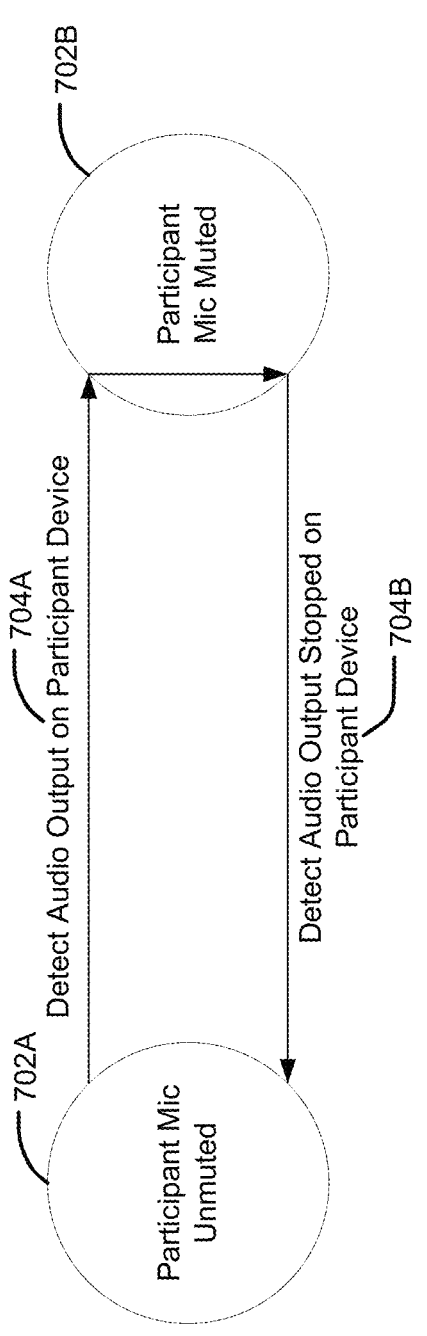
FIG. 7A is a diagram illustrating intelligent mic control, according to some embodiments of the technology described herein.

FIG. 7A is a diagram 700 illustrating intelligent mic control, according to some embodiments of the technology described herein. The mic control illustrated in FIG. 7A may be performed by guidance system 100 described herein with reference to FIG. 1A to control mics of participant devices.

The diagram 700 includes a first state 702A in which a participant device's mic is unmuted. At reference 704A, the system then detects audio output on the participant device separate from the shared content. For example, the system may determine that the participant device is playing an audio file (e.g., a media file) separate from the shared content. The system then automatically mutes the mic of the participant device thereby transitioning it to the second state 702B. At reference 704B, the system detects that the audio output has stopped on the participant device. For example, the system may determine that the participant device has stopped playing the audio file separate from the shared content. The system may then unmute the mic to return it to the first state 702A.

Figure 7B:
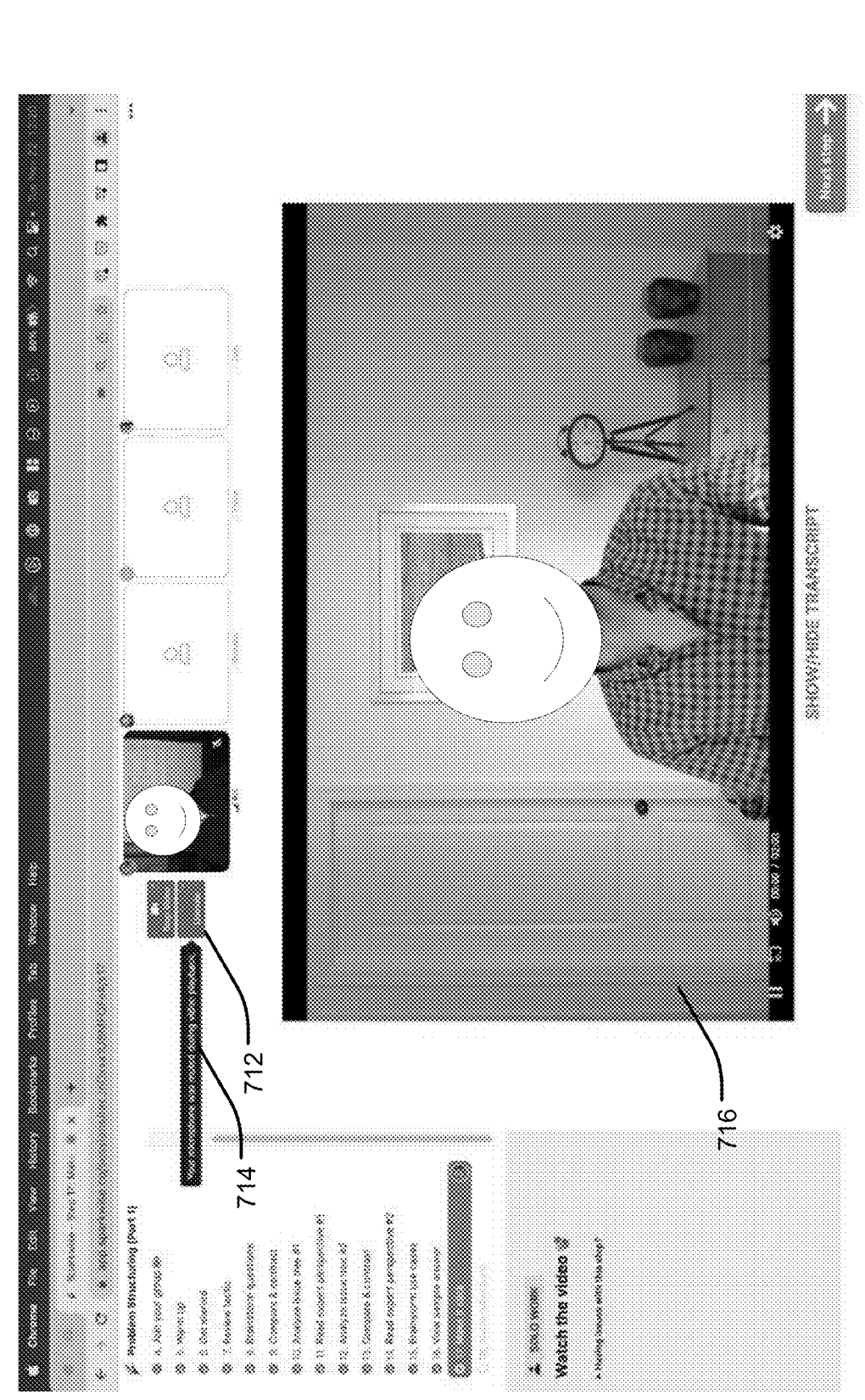
FIG. 7B shows an example GUI indicating that a participant device's mic has been automatically muted, according to some embodiments of the technology described herein.

In some embodiments, the system may provide an indication through a GUI displayed by a participant device informing the participant that the participant device's mic has been muted. FIG. 7B shows an example GUI 710 indicating that the participant device's mic has been automatically muted, according to some embodiments of the technology described herein. As shown in FIG. 7B, the GUI 710 includes a mic control 712 showing that the participant device's mic is muted. The GUI 710 further includes a pop-up notification 714 indicating that the participant device's mic has been muted during playback of the video 716 in the GUI 710. The mic may be unmuted after playback of the video 716 is stopped. The GUI 710 may include another notification indicating that the mic has been unmuted.

As illustrated in FIG. 7A, in some embodiments, the system may only control the mic if it was in an initially unmuted state. For example, if the mic was muted by a participant, then the system may not change a state of the mic based on detecting the audio output or on detecting stoppage of the audio output. The system may leave the mic of the participant device muted. In some embodiments, the intelligent control depicted by diagram 700 may be toggled on/off by the participant using a configurable setting.

FIGS. 8A-8I are example GUIs associated with states of example shared content, according to some embodiments of the technology described herein.

Figure 8A:
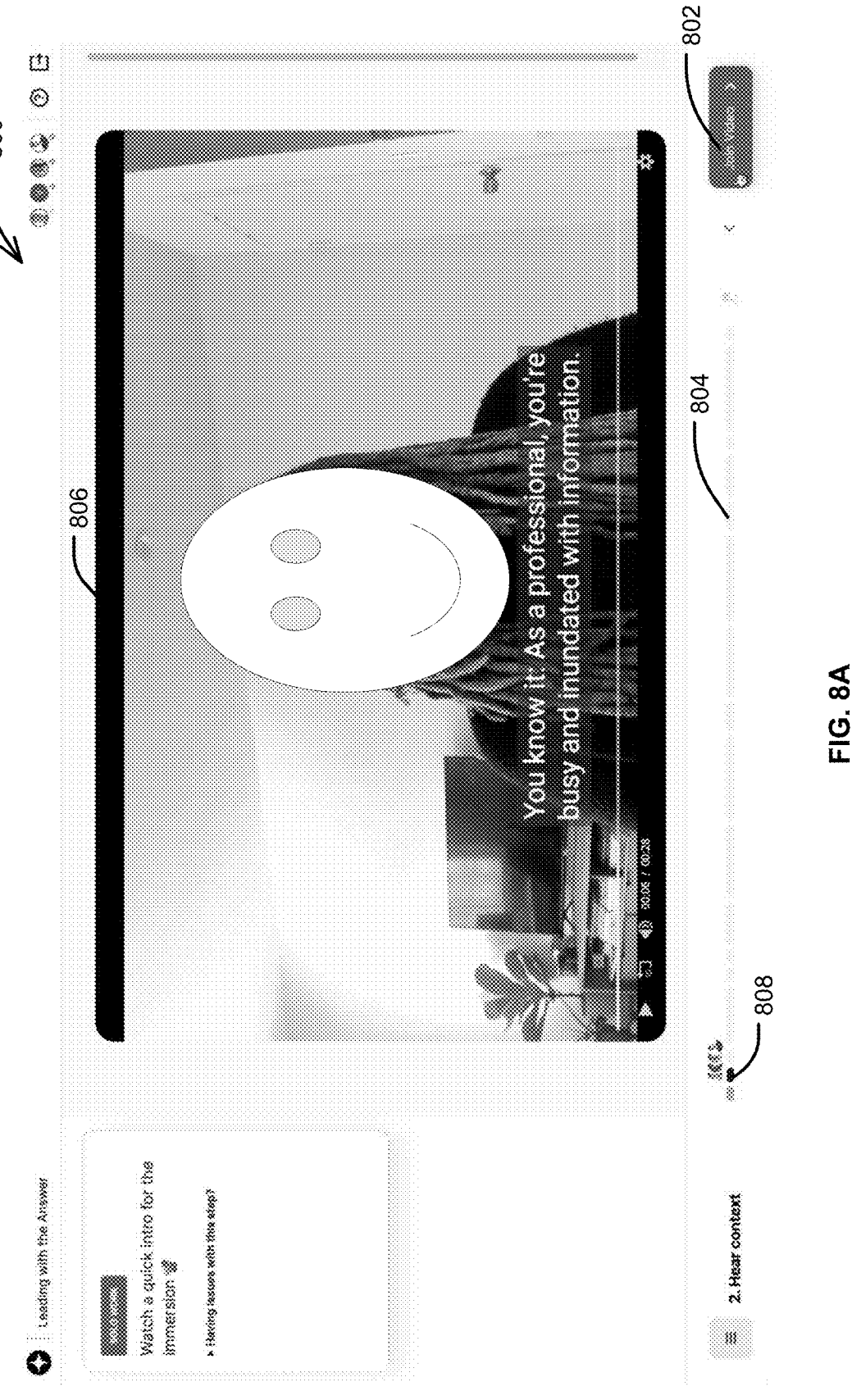
FIGS. 8A-8I are example GUIs associated with states of example shared content, according to some embodiments of the technology described herein.

FIG. 8A shows a GUI 800 in which a participant is provided an option to join a video conference. As shown in FIG. 8A, the GUI 800 includes a button 802 that, when selected (e.g., by clicking and/or tapping), connects a video stream of the participant's device. The GUI 800 further includes a portion 806 displaying an introductory video that may provide the participant information about the shared content (e.g., instructions on how to navigate the content). The GUI 800 further includes a progress indicator 804. The progress indicator 804 indicates a current state 808 of the participant among a sequence of states represented by bars (e.g., where the bar length indicates an expected amount of time to be spent in a state represented by the segment). The progress indicator 804 further indicates which state each of the other participants are. The state of each of the other participants is indicated by an icon associated with the participant above a bar that represents the state that the participant is in.

Figure 8B:

FIG. 8B shows a GUI 810 in which a participant is presented with a listing 812 of a sequence of states of the shared content. Each of the listed states may be selectable. When a particular state is selected from the listing 812, the participant's device may be transitioned to the selected state.

Figure 8C:
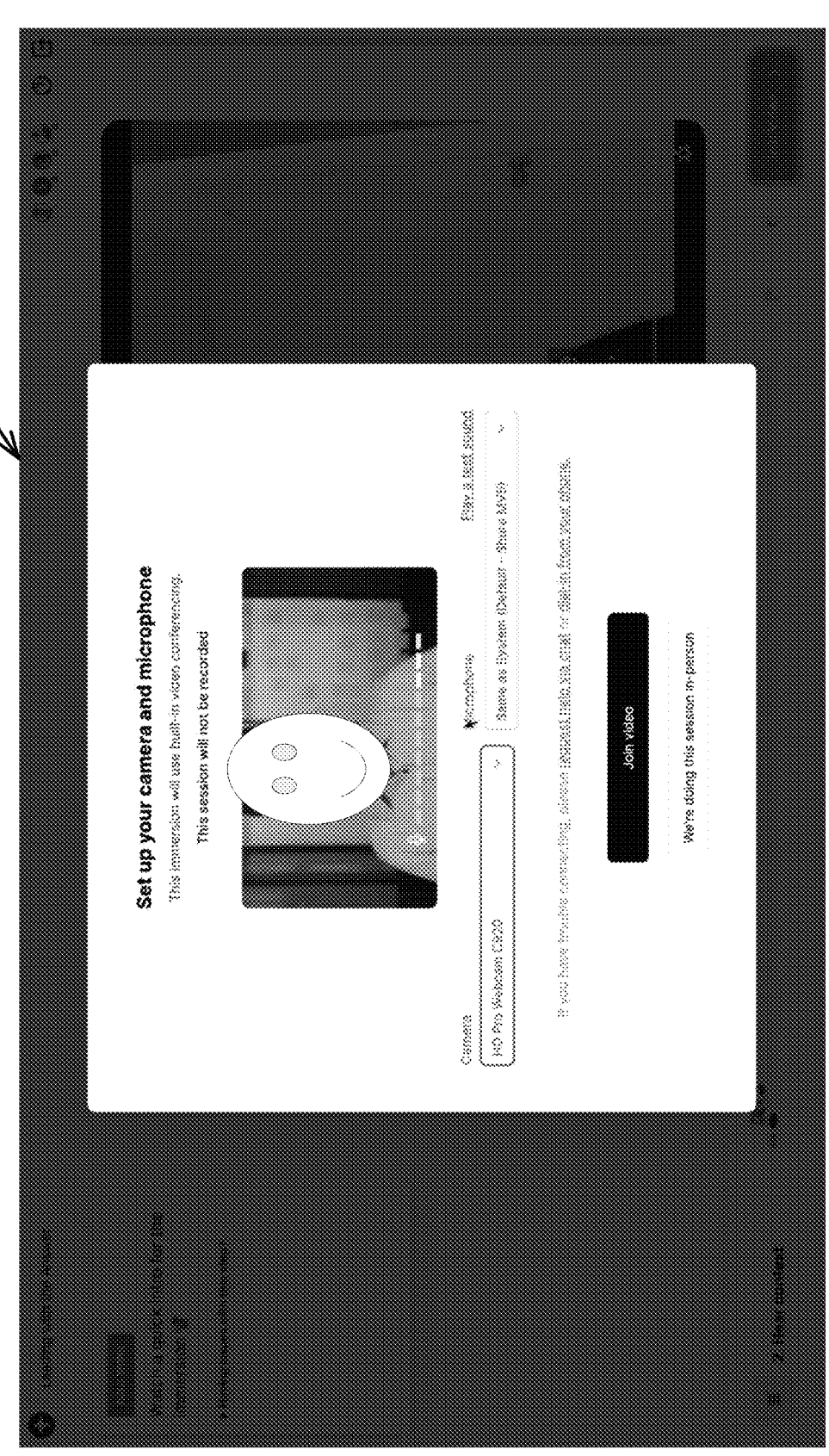

FIG. 8C shows a GUI 820 in which a participant is prevented with various options to configure a video stream (e.g., from a camera used by the participant's device) and/or an audio stream (e.g., from a microphone used by the participant's device). For example, the GUI 810 may allow the participant to select a particular camera and/or microphone as a source of the video and/or audio stream. The GUI 820 allows the participant to join a video conference (by selecting the "Join video" option, or that the participant is joining an in-person session by selecting the "We're doing this session in-person" option.

Figure 8D:
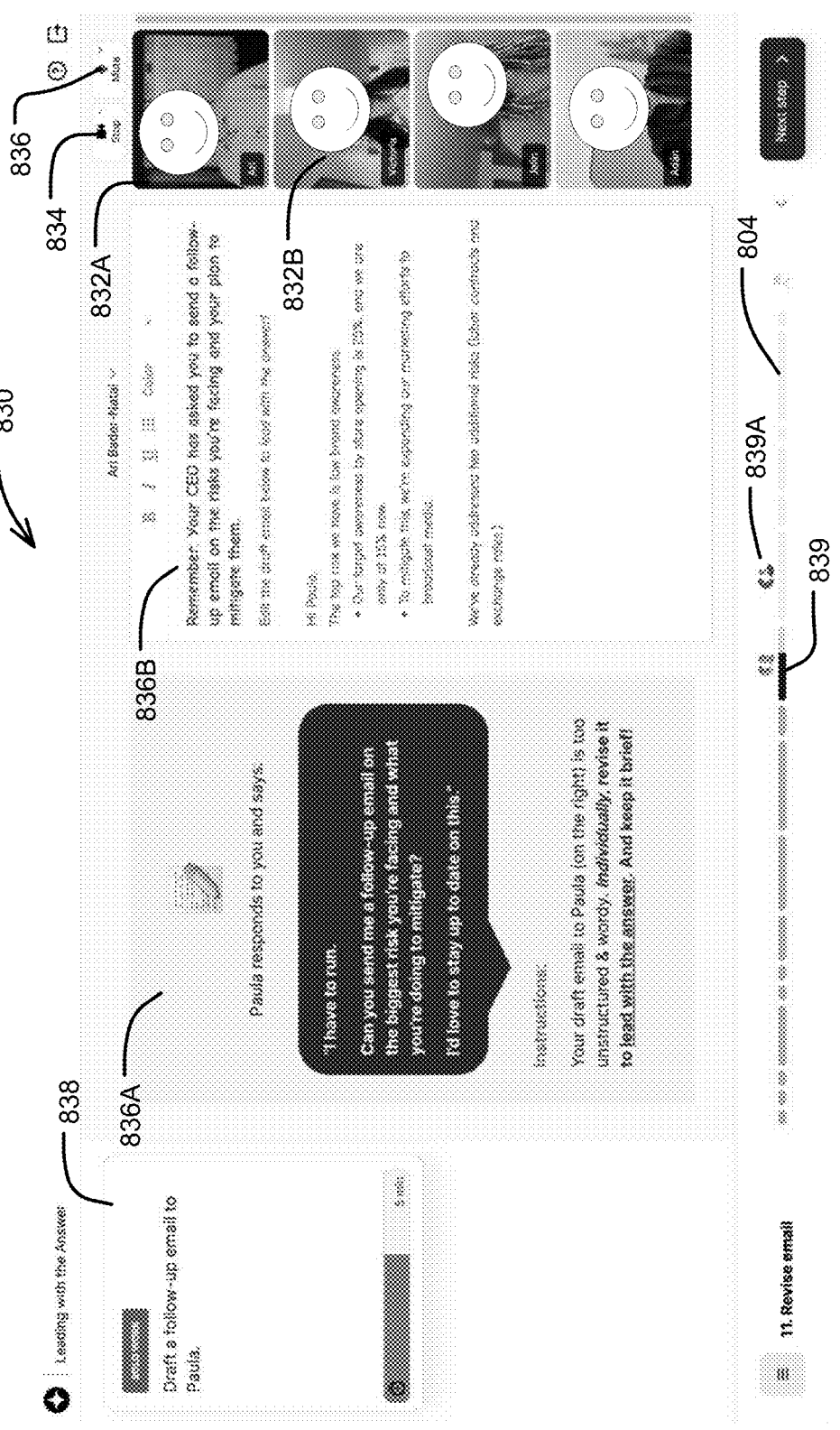

FIG. 8D shows a GUI 830 associated with a state entitled "Revise email". The GUI 830 includes a prompt 838 instructing the participant. The GUI 830 includes a text field 836B in which the participant may enter text (e.g., a draft email). The section 836A shows feedback generated based on the text input by the user in the field 836B. The GUI 830 includes an option 834 to toggle a video stream of the participant on or off. The GUI 830 further includes an option 836 to toggle the participant device's mic on or off. The GUI 830 displays a video stream 832A of the participant and video streams of the other participants (e.g., video stream 832B). The progress indicator 804 is updated relative to FIG. 8A as the states of the participants have changed. The participant is now at the state represented by bar 839. The completed previous states are colored green. The progress indicator 804 further indicates two participants 839A at a state subsequent to the state of the participant.

Figure 8E:
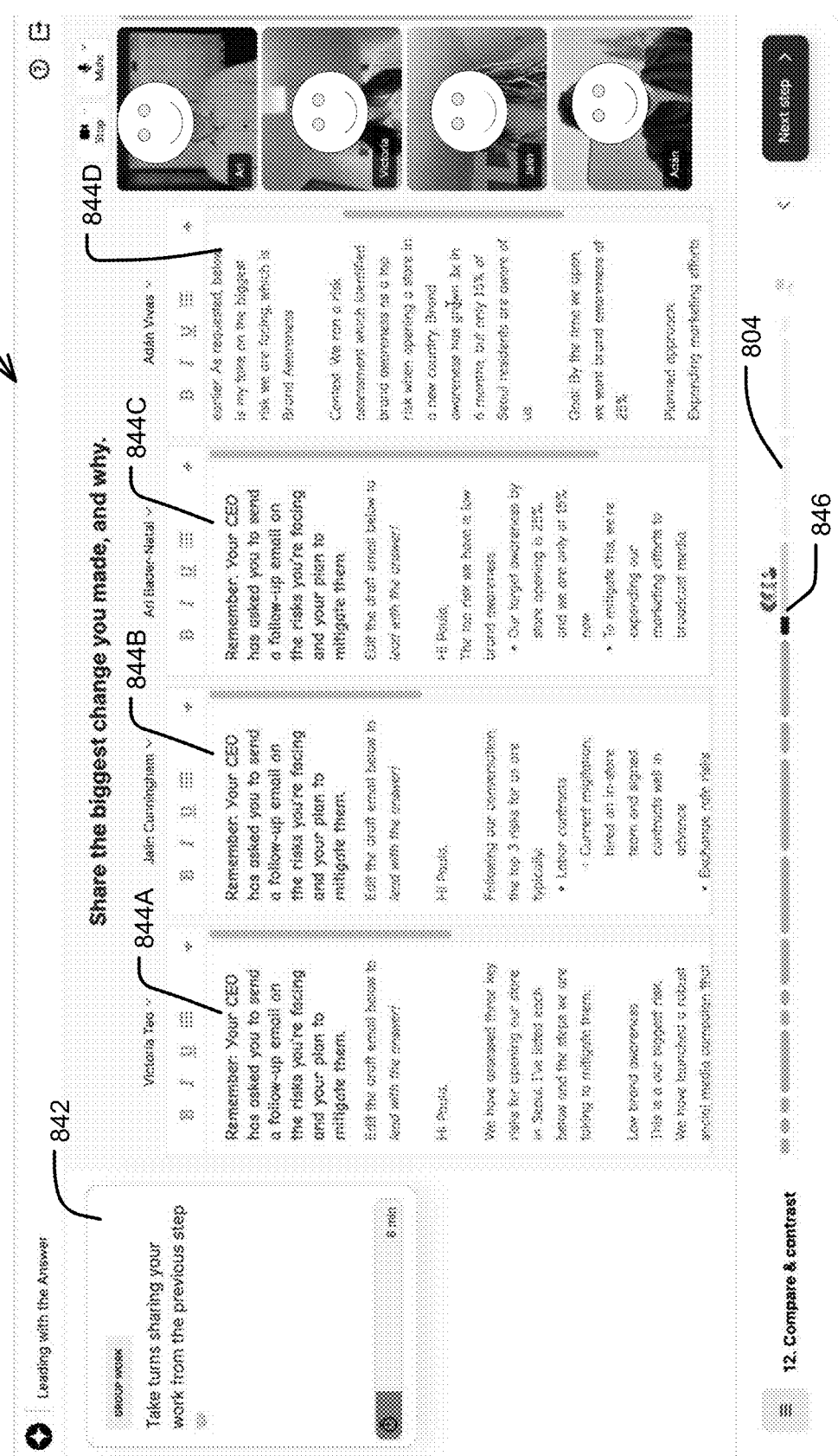

FIG. 8E shows a GUI 840 associated with a state entitled "Compare & contrast". The GUI 840 includes a prompt 842 instructing the participants. The GUI 840 includes text fields 844A, 844B, 844C, 844D each associated with a different participant. Each of the text fields 844A, 844B, 844C, 844D may show text inputted by a respective one of the participants (e.g., in another state). The text fields 844A, 844B, 844C, 844D may be updated in real time as participants input information through their respective devices. The progress bar 804 indicates that all the participants are at the same state, which is represented by bar 846 of the progress indicator 804.

Figure 8F:
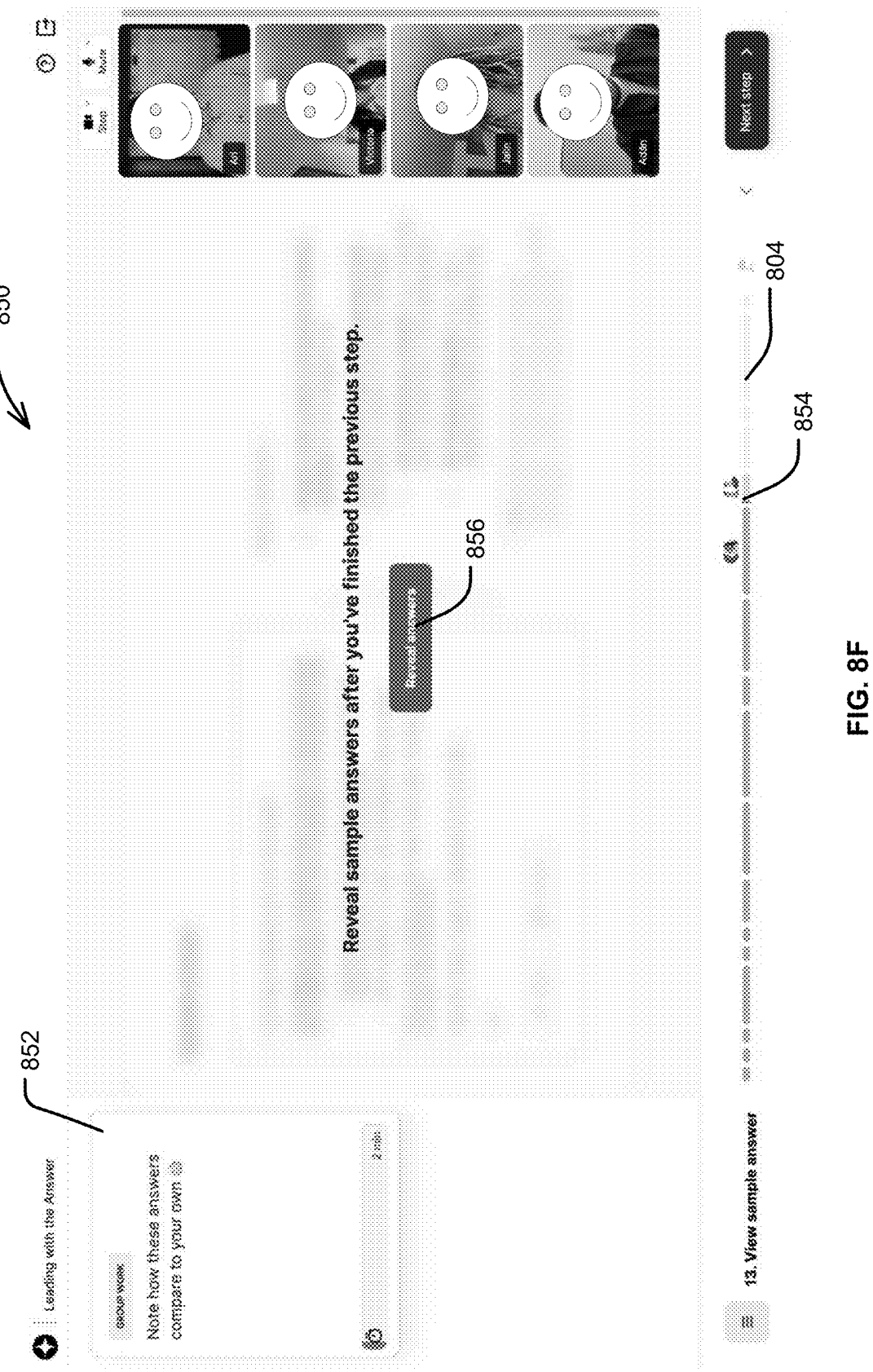

FIG. 8F shows a GUI 850 through which the participant can select an option 856 to reveal sample answers after completing a task in a previous state. The GUI 850 further includes a prompt 852 instructing the participant to note how the revealed answers compare to those of the participant.

Figure 8G:
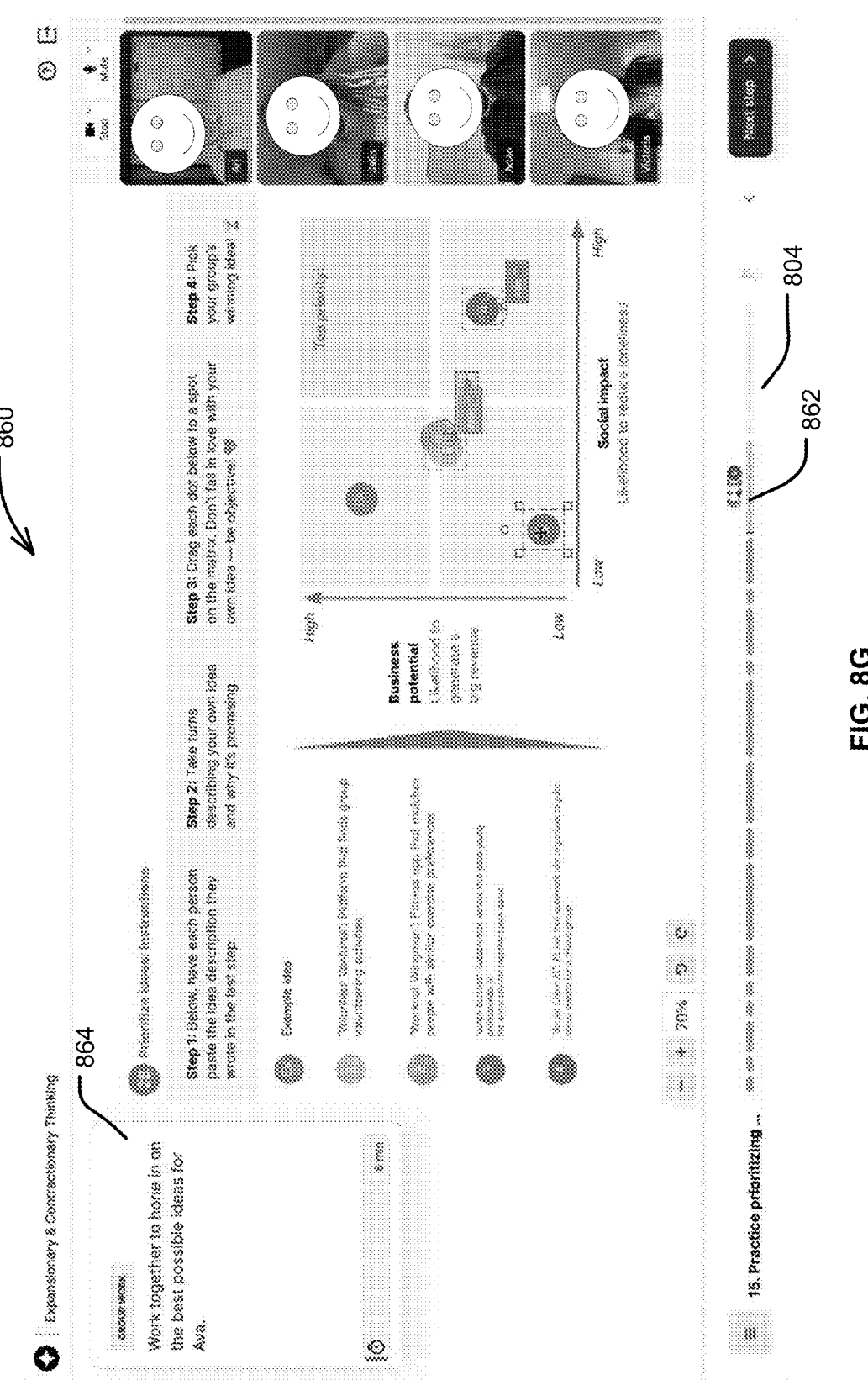

FIG. 8G shows a GUI 860 that includes an interactive interface through which the participants in the shared content can work together. The GUI 860 includes a prompt 864 instructing the participant to work together to perform a task. The progress indicator 804 is updated to indicate that all the participants are at the same state represented by bar 862 of the progress indicator 804.

Figure 8H:
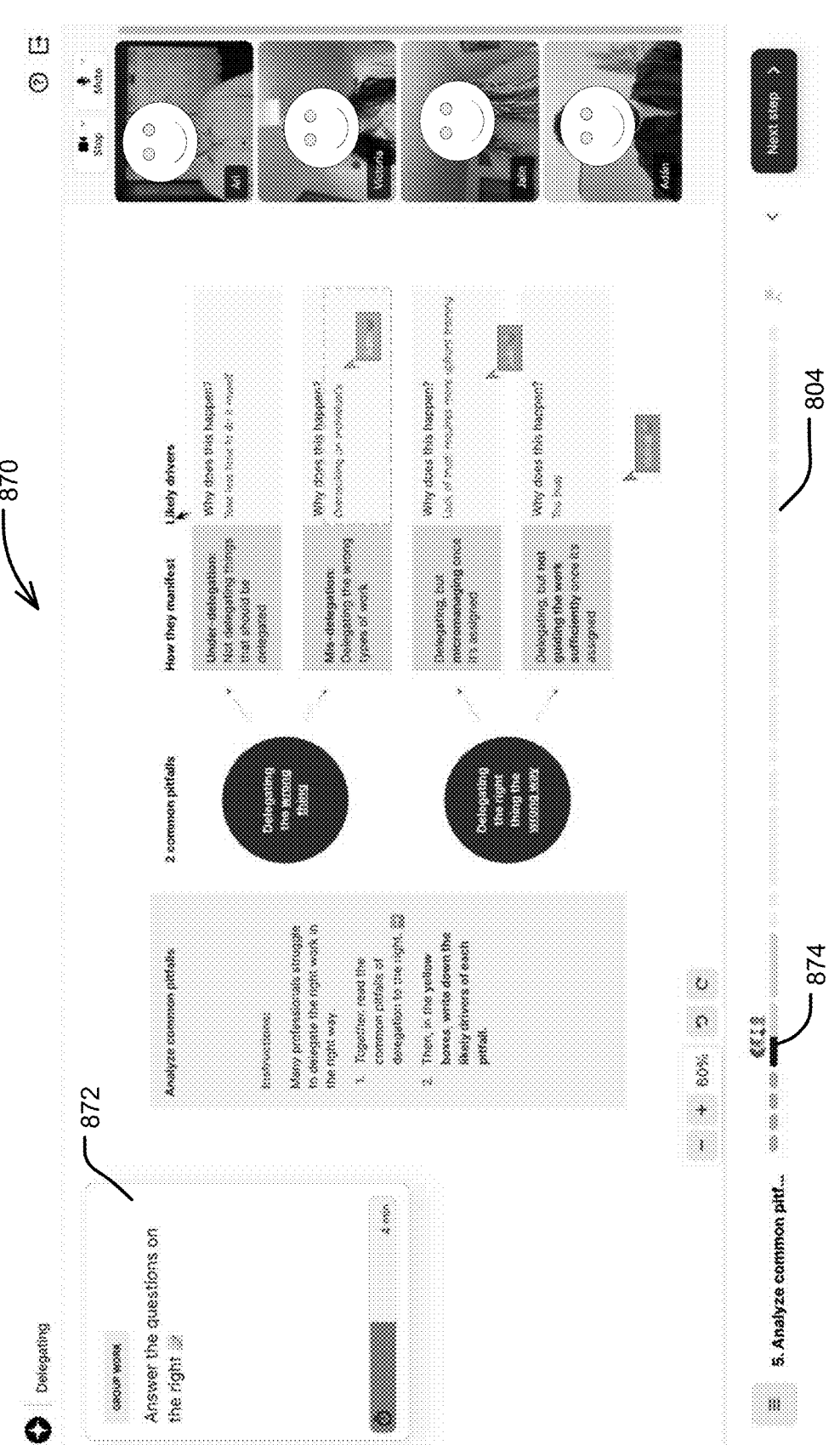

FIG. 8H shows a GUI 870 that includes an interface through which the participant answers various questions. The GUI 870 includes a prompt 872 instructing the user to answer the questions in the GUI 870. The progress indicator 804 shows that all the participants are at the same state represented by bar 874 of the progress indicator 804.

Figure 8I:
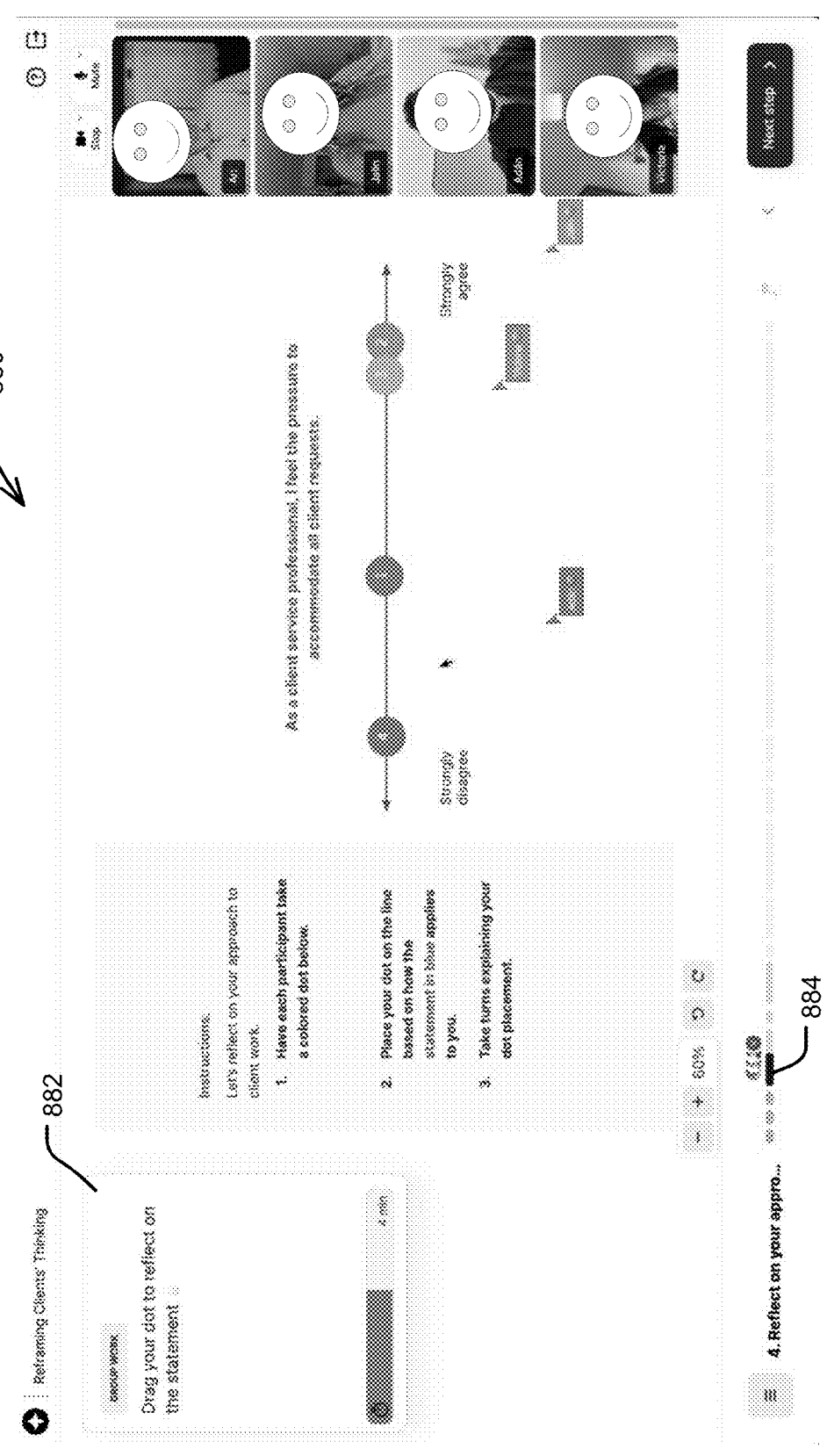

FIG. 8I shows a GUI 880 in which the participant drags a dot to a position on a graph. The GUI 880 shows positions of the other participants on the graph. The GUI 880 includes a prompt 882 instructing the participant to drag a dot to a position in the graph.

FIGS. 9A-9E are example GUIs associated with states of example shared content, according to some embodiments of the technology described herein.

Figure 9A:
FIGS. 9A-9E are example GUIs associated with states of example shared content, according to some embodiments of the technology described herein.
Figure 9A:
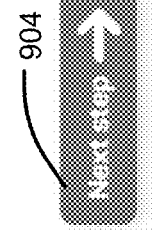
Figure 9A:
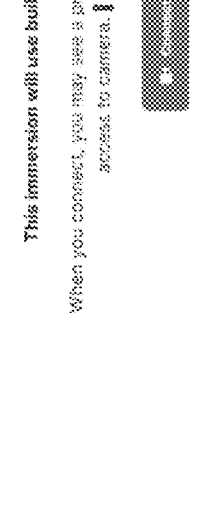
Figure 9A:
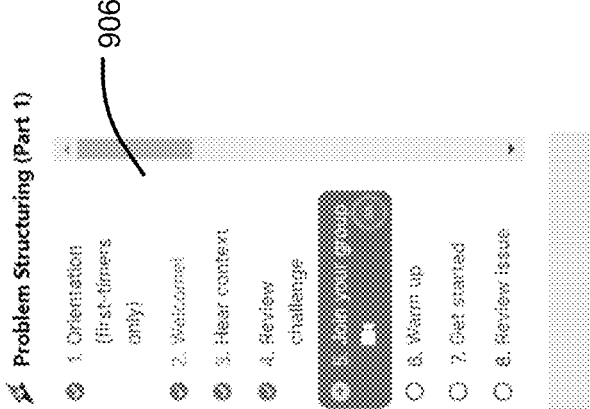
Figure 9A:
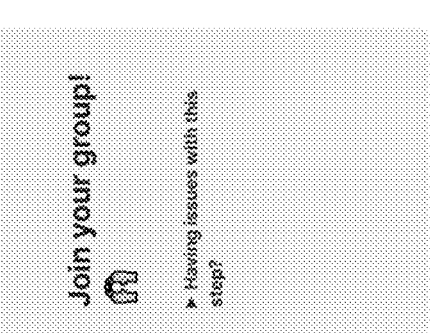

FIG. 9A shows a GUI 900 in which a participant is provided an option to join a video conference. As shown in FIG. 9A, the GUI 900 includes a button 902 that, when selected, connects a video stream of the participant device. The GUI 900 further includes a "Next step" button 904 that, when selected, transitions the participant to a subsequent state of the shared content. The GUI 900 further includes a listing 906 of a sequence of states of the shared content. Each of the listed states may be selectable. When selected, the participant device may be transitioned to the selected state.

Figure 9B:
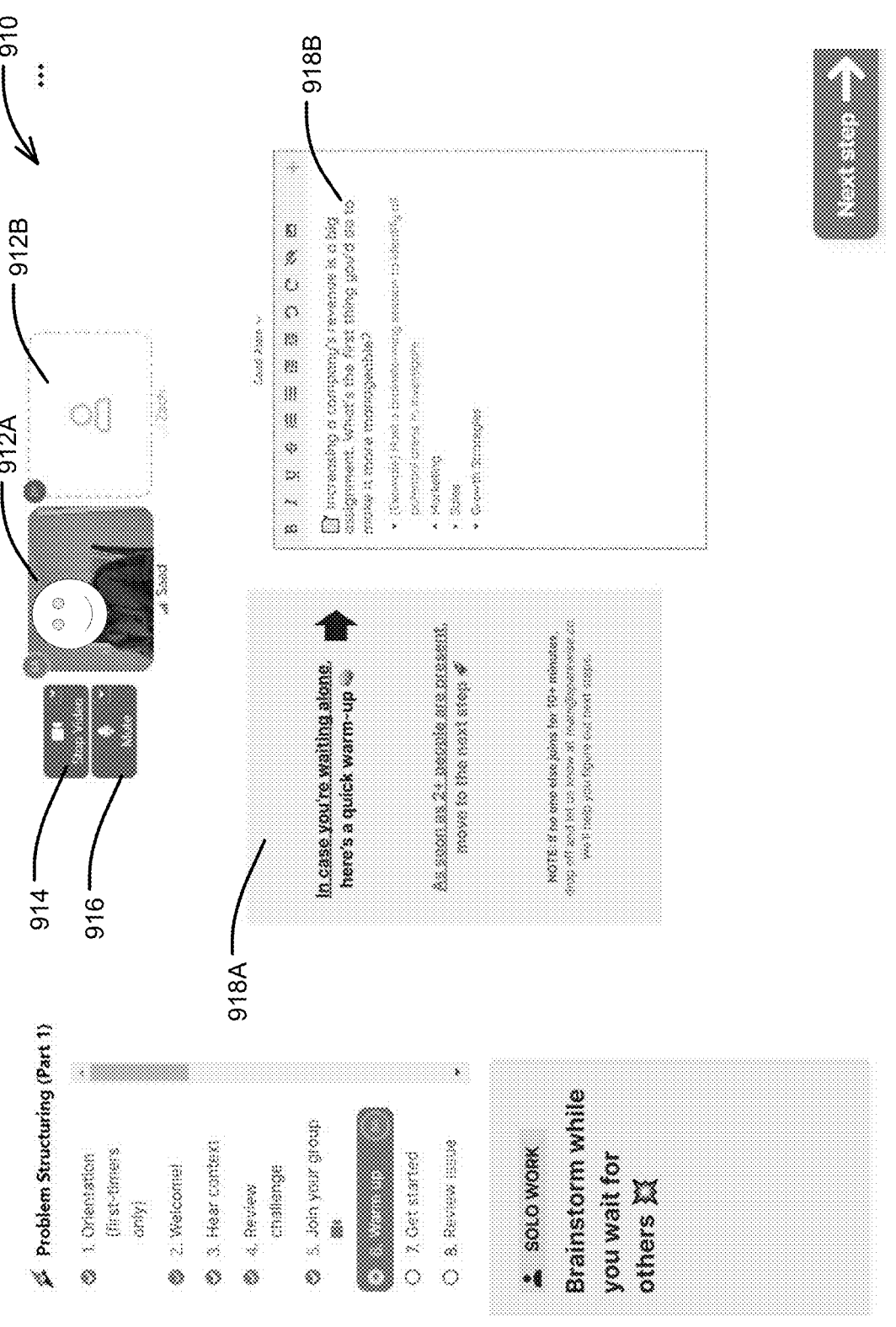

FIG. 9B shows a GUI 910 associated with a subsequent state titled "Warm up". As shown in FIG. 9B, the GUI 910 now includes a section 912A displaying video stream data from the participant device. The GUI 910 includes another section 912B for displaying video stream data of another participant. The GUI 910 further includes a configurable option 914 to stop the video stream data of the participant and a configuration option 916 to mute or unmute a mic. The GUI 910 includes a section 918A displaying instructions for the participant and a section 918B in which the participant can provide text input.

Figure 9C:
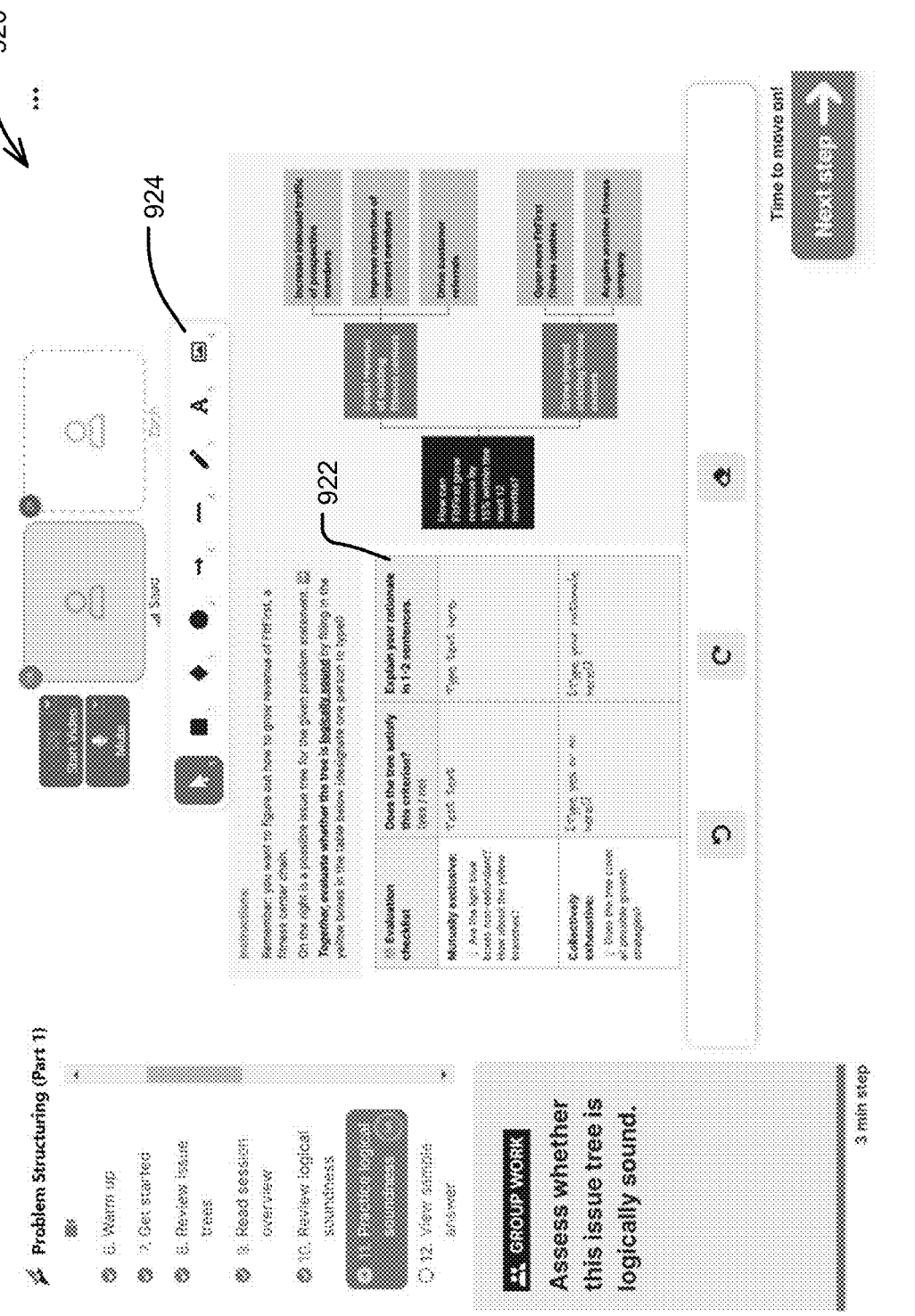

FIG. 9C shows a GUI 920 associated with a state titled "Practice logical soundness". The GUI 920 includes a table 922 with editable fields in which the participant can input information (e.g., textual information). The GUI 920 further includes a menu 924 from which the participant can select different types of input tools (e.g., cursor, text box, marker, and other input tools).

Figure 9D:
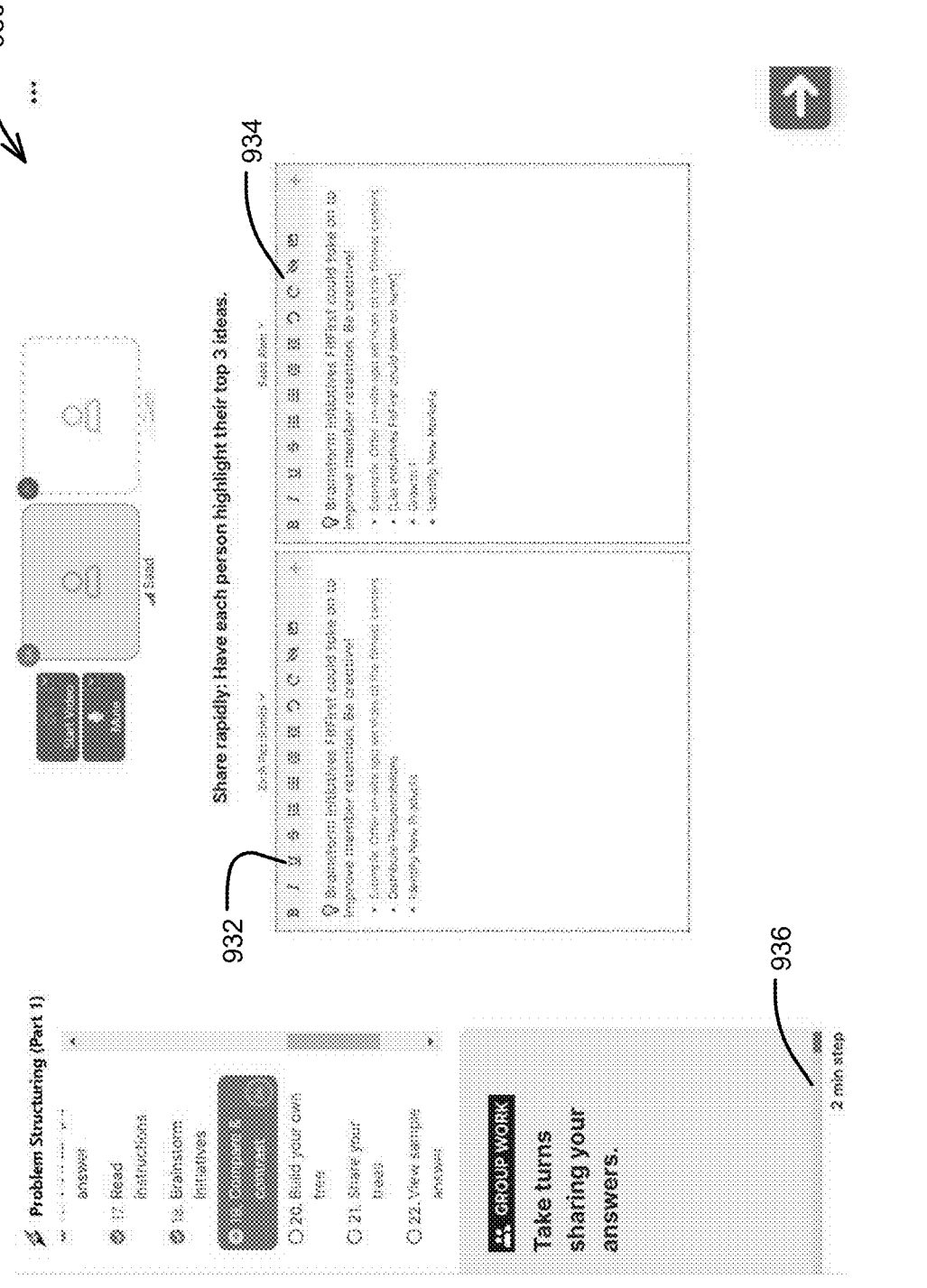

FIG. 9D shows a GUI 930 associated with a state titled "Compare & contrast". The GUI 930 includes text editor interfaces 932, 934 of the participant and another participant. The interface 932 of the other participant may be updated to display input provided by the other participant as the other participant provides the input. For example, the interface 932 may show text input by the other participant using a device of the other participant. The GUI 930 may thus allow the participants to view each other's content and work together. The GUI 930 includes an indication 936 of a threshold amount of time allotted for the state (i.e., 2 minutes), and an indication of how much time has elapsed relative to the threshold amount of time. In the example of FIG. 9D, there is a bar that grows with the passage of time until the threshold amount of time has elapsed.

Figure 9E:
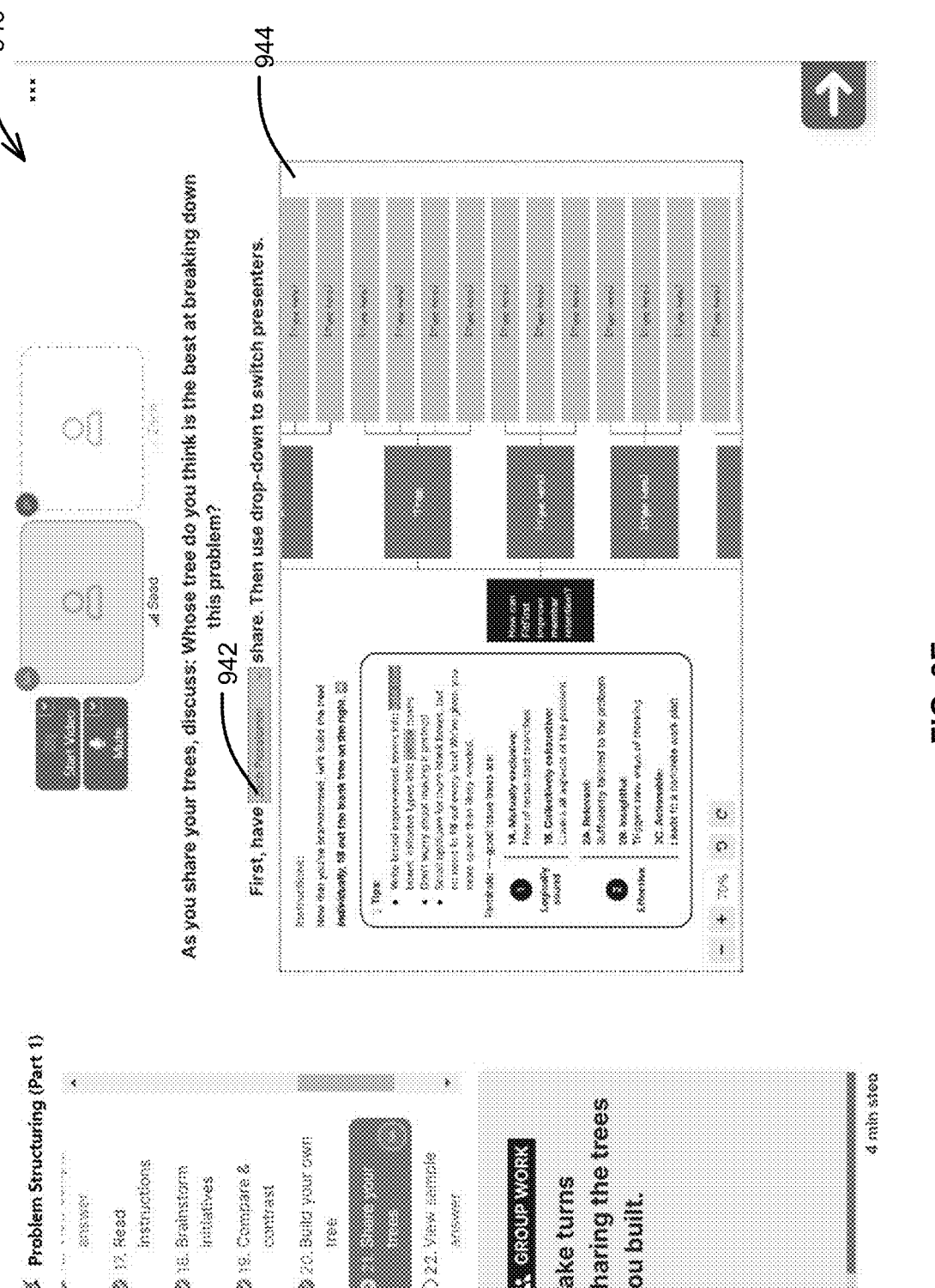

FIG. 9E shows a GUI 940 associated with a state titled "Share your trees". The GUI 940 includes a menu 942 from which a particular participant can be selected to share and make modifications to a graphic 944. When the particular participant is selected from the menu 942, the participant may be able to make modifications. The participants may thus take turns editing the graphic 944 in the GUI 940.

It should be appreciated that the GUIs described herein are for illustration purposes. GUIs different from those illustrated in examples herein may be used in some embodiments.

Figure 10:
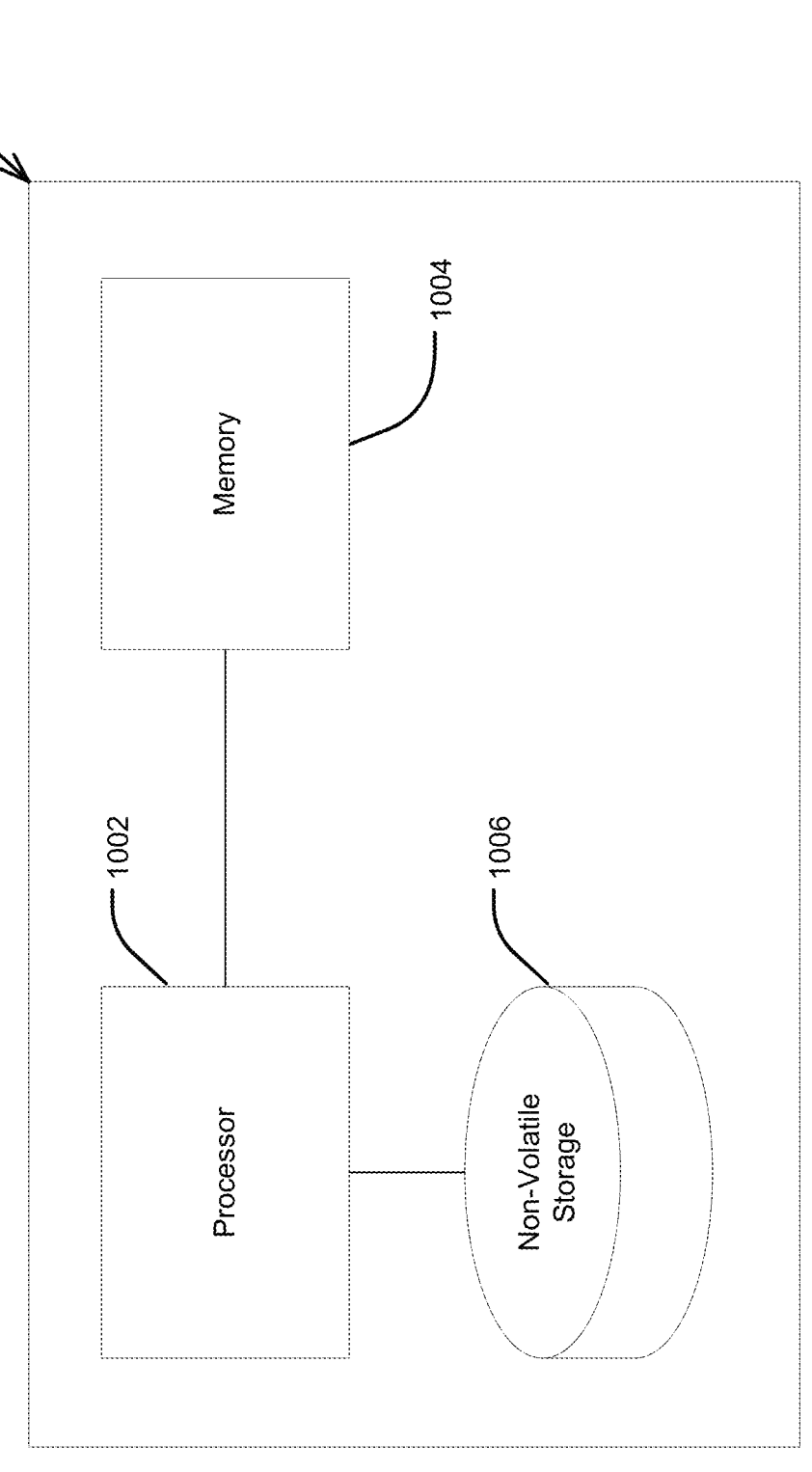
FIG. 10 is an example computer system which may be used to implement some embodiments of the technology described herein.

FIG. 10 is an example computer system 1000 which may be used to implement some embodiments of the technology described herein. The computing system 1000 may include one or more computer hardware processors 1002 and non-transitory computer-readable storage media (e.g., memory 1004 and one or more non-volatile storage devices 1006). The processor(s) 1002 may control writing data to and reading data from (1) the memory 1004; and (2) the non-volatile storage device(s) 1006. To perform any of the functionality described herein, the processor(s) 1002 may execute one or more processor-executable instructions stored in one or more non-transitory computer-readable storage media (e.g., the memory 1004), which may serve as non-transitory computer-readable storage media storing processor-executable instructions for execution by the processor(s) 1002.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform tasks or implement abstract data types. Typically, the functionality of the program modules may be combined or distributed.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B." or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A system for guiding progression of multiple participants through shared content in real time while each of the participants interacts with the shared content using a respective one of a plurality of computing devices, the shared content including a sequence of states through which the participants progress to complete an objective, where each of the sequence of states is associated with at least one graphical user interface (GUI), the system comprising:

a processor;

a non-transitory computer-readable storage medium storing instructions that, when executed by the processor, cause the processor to:

initiate a communication session in which the system connects, through a communication network, to the plurality of computing devices;

provide, through the communication network to the plurality of computing devices, GUIs through which the participants can concurrently interact with the shared content, wherein each of the GUIs includes:

a navigation interface configured to allow a respective participant to transition between the sequence of states of the shared content independently of other ones of the participants; and an indication of current states of the other participants in the shared content;

advance, using computer-guidance, the participants through the sequence of states to completion of the objective, the computer-guidance comprising:

detect an update to a current state of one of the participants in the shared content;

in response to detecting the update to the current state of the participant in the shared content, update at least some of the GUIs provided to the plurality of computing devices to indicate the updated state of the participant.

2. The system of claim 1, wherein the instructions further cause the processor to:

receive, through the communication network from at least some of the plurality of computing devices, video streaming data obtained using cameras of the at least some computing devices; and transmit, through the communication network to the plurality of computing devices, the video stream data for display in the GUIs.

3. The system of claim 2, wherein the instructions further cause the processor to:

detect that a first GUI is inactive in a display of a first one of the plurality of computing devices; and modify, in one or more of the GUIs other than the first GUI, a display of video stream data received from the first computing device in response to detecting that the GUI is inactive in the display of the first computing device.

4. The system of claim 3, wherein modifying the display of the video stream data received from the first computing device comprises one of:

pausing the display of the video stream data, blurring the display of the video stream data, or replacing the display of the video stream data with a message.

5. The system of claim 1, wherein the instructions further cause the processor to individually track the current states of the participants, wherein individually tracking the current states of the participants comprises, for each of the participants, storing an amount of time spent by the participant in each of the sequence of states of the shared content.

6. The system of claim 5, wherein the instructions further cause the processor to:

for each of the participants:

determine whether an amount of time spent by the participant in a particular one of the sequence of states has reached a threshold amount of time; and generate, in a GUI provided to a computing device of the plurality of computing devices being used by the participant, a graphical element indicating that the participant has spent the threshold amount of time in the particular state.

7. The system of claim 1, wherein detecting the update to the current state of the participant in the shared content comprises:

receiving, through a GUI associated with a first one of the sequence of states, input indicating a request for the participant to transition from the first state to a second one of the sequence of states;

wherein updating the at least some GUIs to indicate the updated state of the participant comprises updating GUIs of other ones of the participants to indicate that the participant is in the second state.

8. The system of claim 7, wherein the instructions further cause the processor to:

update a stored current state of the participant from the first state to the second state in response to receiving the input indicating the request for the participant to transition from the first state to the second state.

9. The system of claim 1, wherein the update to the current state of the participant comprises a transition to a previous one of the sequence of states.

10. The system of claim 1, wherein the update to the current state of the participant comprises a transition to a subsequent one of the sequence of states.

11. The system of claim 1, wherein the sequence of states of the shared content include:

a first state associated with a first interactive GUI; and a second state associated with a second interactive GUI different from the first interactive GUI.

12. The system of claim 1, wherein the at least one GUI comprises one or more of:

a shared text editor editable through any of the GUIs;

a shared canvas editor editable through any of the GUIs;

a shared spreadsheet editable through any of the GUIs;

an image adjacent a text editor; and a video clip with a textual transcript.

13. The system of claim 1, wherein:

at least one of the sequence of states of the shared content is associated with a GUI comprising a read-only display showing content authored in another state by the participant; and the instructions further cause the processor to:

receive, through the communication network from a particular one of the plurality of computing devices, input modifying the content in the other state by the participant; and update the read-only display to show modified content in response to receiving the input modifying the content in the other state by the participant.

14. The system of claim 1, wherein the instructions further cause the processor to:

determine that a particular one of the plurality of computing devices is outputting audio separate from audio of the shared content; and automatically mute a mic of the particular computing device in response to determining that the particular computing device is outputting the audio separate from the audio of the shared content.

15. The system of claim 14, wherein the instructions further cause the processor to:

determine that the particular computing device has stopped outputting the audio separate from the audio of the shared content; and automatically unmute the mic of the particular computing device in response to determining that the particular computing device has stopped outputting the audio separate from the audio of the shared content.

16. The system of claim 1, wherein the instructions cause the processor to:

for each of the sequence of states of the shared content:

store a name, target duration, type, and one or more configuration parameters for the state.

17. The system of claim 1, wherein the indication of the current states of the other participants comprises:

a plurality of graphical elements each representing a respective state of the sequence of states; and icons associated with respective ones of the participants, each of the icons positioned proximate to a respective one of the plurality of graphical elements that represents a state that a participant associated with the icon is in.

18. The system of claim 1, the instructions cause the processor to:

collect information about a participant's navigation through the sequence of states;

determine, based on the information, that one or more criteria for generating a prompt for at least one of the participants are met; and generate, in at least one of the GUIs associated with at least one participant, the prompt in response to determining that the one or more criteria are met, the prompt indicating an automatically generated instruction for the at least one participant.

19. A method for guiding progression of multiple participants through shared content in real time while each of the participants interacts with the shared content using a respective one of a plurality of computing devices, the shared content including a sequence of states through which the participants progress to complete an objective, where each of the sequence of states is associated with at least one graphical user interface (GUI), the method comprising:

using a processor to perform:

initiating a communication session in which the system connects, through though a communication network, to the plurality of computing devices;

providing, through the communication network to the plurality of computing devices, GUIs through which the participants can concurrently interact with the shared content, wherein each of the GUIs includes:

a navigation interface configured to allow a respective participant to transition between the sequence of states of the shared content independently of other ones of the participants; and an indication of current states of the other participants in the shared content;

advancing, using computer-guidance, the participants through the sequence of states to completion of the objective, the computer-guidance comprising:

detecting an update to a current state of one of the participants in the shared content;

in response to detecting the update to the current state of the participant in the shared content, updating at least some of the GUIs provided to the plurality of computing devices to indicate the updated state of the participant.

20. A non-transitory computer-readable storage medium storing instructions that, when executed by a processor, cause the processor to perform a method of guiding progression of multiple participants through shared content in real time while each of the participants interacts with the shared content using a respective one of a plurality of computing devices, the shared content including a sequence of states through which the participants progress to complete an objective, where each of the sequence of states is associated with at least one graphical user interface (GUI), the method comprising:

initiating a communication session in which the system connects, though a communication network, to the plurality of computing devices;

providing, through the communication network to the plurality of computing devices, GUIs through which the participants can concurrently interact with the shared content, wherein each of the GUIs includes:

a navigation interface configured to allow a respective participant to transition between the sequence of states of the shared content independently of other ones of the participants; and an indication of current states of the other participants in the shared content;

advancing, using computer-guidance, the participants through the sequence of states to completion of the objective, the computer-guidance comprising:

detecting an update to a current state of one of the participants in the shared content; and in response to detecting the update to the current state of the participant in the shared content, updating at least some of the GUIs provided to the plurality of computing devices to indicate the updated state of the participant.

*   *   *   *   *